United States Patent
Li et al.

(10) Patent No.: US 10,045,369 B2
(45) Date of Patent: Aug. 7, 2018

(54) APPARATUS, METHOD AND SYSTEM OF MULTI-USER DOWNLINK TRANSMISSION

(71) Applicant: INTEL IP CORPORATION, Santa Clara, CA (US)

(72) Inventors: Qinghua Li, San Ramon, CA (US); Huaning Niu, Milpitas, CA (US); Po-Kai Huang, Santa Clara, CA (US); Robert Stacey, Portland, OR (US); Rongzhen Yang, Shanghai (CN); Guoqing Li, Portland, OR (US); Hujun Yin, Saratoga, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 121 days.

(21) Appl. No.: 14/472,406

(22) Filed: Aug. 29, 2014

(65) Prior Publication Data
US 2015/0358995 A1 Dec. 10, 2015

Related U.S. Application Data

(60) Provisional application No. 62/009,789, filed on Jun. 9, 2014.

(51) Int. Cl.
*H04W 74/06* (2009.01)
*H04L 5/00* (2006.01)
(Continued)

(52) U.S. Cl.
CPC ...... *H04W 72/1273* (2013.01); *H04B 7/0452* (2013.01); *H04L 5/0007* (2013.01);
(Continued)

(58) Field of Classification Search
CPC ..... H04L 5/006; H04L 5/0064; H04L 5/0023; H04L 5/0037; H04L 25/03343;
(Continued)

(56) References Cited

U.S. PATENT DOCUMENTS 6,975,611 B1 12/2005 Balachandran et al.
8,289,911 B2 10/2012 Chun et al.
(Continued)

FOREIGN PATENT DOCUMENTS

CN 1909537 2/2007
CN 101048948 5/2012
(Continued)

OTHER PUBLICATIONS

International Search Report of PCT/US2015/029635, dated Aug. 20, 2015, 12 pages.
(Continued)

*Primary Examiner* — Redentor Pasia
*Assistant Examiner* — Peter Mak
(74) *Attorney, Agent, or Firm* — Shichrur & Co.

(57) ABSTRACT

Some demonstrative embodiments include devices, systems and methods of multi-user downlink transmission. For example, an apparatus may include a transmitter to transmit a multi-user (MU) downlink request to a plurality of wireless stations; and a receiver to receive one or more responses from one or more wireless stations of the plurality of wireless stations, wherein the transmitter is to transmit to the plurality of wireless stations a MU scheduling message indicating resources allocated to a downlink transmission to at least one scheduled station of the one or more wireless stations, and to transmit the downlink transmission to the at least one scheduled station according to the MU scheduling message.

23 Claims, 9 Drawing Sheets

(51) Int. Cl.
  *H04B 7/04* (2017.01)
  *H04W 72/04* (2009.01)
  *H04W 72/12* (2009.01)
  *H04B 7/0452* (2017.01)

(52) U.S. Cl.
  CPC ....... *H04L 5/0055* (2013.01); *H04W 72/0413* (2013.01); *H04W 74/06* (2013.01)

(58) Field of Classification Search
  CPC ....... H04L 2025/03802; H04L 25/0224; H04L 5/0058; H04W 74/04
  See application file for complete search history.

(56) References Cited

U.S. PATENT DOCUMENTS

| | | |
|---|---|---|
| 2003/0198244 A1 | 10/2003 | Ho et al. |
| 2006/0114878 A1 | 6/2006 | Choe et al. |
| 2007/0014268 A1 | 1/2007 | Kim et al. |
| 2007/0091889 A1 | 4/2007 | Xiao et al. |
| 2008/0031191 A1* | 2/2008 | Kashima ............. H04B 7/0452 370/329 |
| 2008/0232490 A1 | 9/2008 | Gross et al. |
| 2009/0219828 A1 | 9/2009 | Sharma |
| 2010/0061334 A1 | 3/2010 | Gault et al. |
| 2010/0118857 A1 | 5/2010 | Chun et al. |
| 2010/0309871 A1* | 12/2010 | Fischer ................. H04L 5/0023 370/329 |
| 2010/0322166 A1* | 12/2010 | Sampath ............. H04W 72/121 370/329 |
| 2011/0002319 A1* | 1/2011 | Husen ................. H04W 72/042 370/338 |
| 2011/0013561 A1 | 1/2011 | Lui et al. |
| 2011/0150004 A1* | 6/2011 | Denteneer ............ H04L 5/0023 370/476 |
| 2011/0176627 A1* | 7/2011 | Wu ...................... H04B 7/0452 375/260 |
| 2011/0194644 A1* | 8/2011 | Liu ...................... H04L 5/0023 375/295 |
| 2011/0287738 A1 | 11/2011 | Peisa et al. |
| 2011/0310752 A1 | 12/2011 | Kim et al. |
| 2011/0317630 A1* | 12/2011 | Zhu ................... H04W 74/0816 370/329 |
| 2012/0051318 A1 | 3/2012 | Seok |
| 2012/0063406 A1 | 3/2012 | Seok |
| 2012/0063433 A1* | 3/2012 | Wentink ............... H04W 76/02 370/338 |
| 2012/0082147 A1 | 4/2012 | Liu et al. |
| 2012/0082200 A1* | 4/2012 | Verikoukis ........... H04L 1/0026 375/227 |
| 2012/0087358 A1* | 4/2012 | Zhu ................... H04W 74/0816 370/338 |
| 2012/0147804 A1 | 6/2012 | Hedayat et al. |
| 2012/0176910 A1 | 7/2012 | Cui |
| 2012/0202493 A1 | 8/2012 | Wang et al. |
| 2012/0275415 A1* | 11/2012 | Wang ................... H04L 1/0041 370/329 |
| 2012/0314627 A1 | 12/2012 | Choi et al. |
| 2013/0070642 A1 | 3/2013 | Kim et al. |
| 2013/0150061 A1 | 6/2013 | Shin |
| 2013/0188567 A1* | 7/2013 | Wang ................... H04L 5/0094 370/329 |
| 2014/0003320 A1 | 1/2014 | Etemad et al. |
| 2014/0010144 A1 | 1/2014 | Liu et al. |
| 2014/0036885 A1 | 2/2014 | Moberg et al. |
| 2014/0079046 A1* | 3/2014 | Yang ................. H04W 74/0825 370/338 |
| 2014/0301374 A1 | 10/2014 | Malkawi et al. |
| 2015/0146808 A1* | 5/2015 | Chu ..................... H04L 5/0037 375/260 |
| 2015/0188680 A1 | 7/2015 | Li et al. |
| 2015/0271860 A1 | 9/2015 | Baghel et al. |
| 2015/0341938 A1 | 11/2015 | Tawashi |
| 2015/0358064 A1* | 12/2015 | Benjebbour ......... H04B 7/0452 370/329 |
| 2015/0359000 A1 | 12/2015 | Li et al. |
| 2015/0359001 A1 | 12/2015 | Li et al. |

FOREIGN PATENT DOCUMENTS

| | | |
|---|---|---|
| EP | 1478134 | 11/2004 |
| TW | 201422037 | 6/2014 |

OTHER PUBLICATIONS

International Search Report and Written Opinion for PCT Application No. PCT/US2015/028217, dated Aug. 27, 2015, 11 pages.
Office Action for U.S. Appl. No. 14/487,767, dated Jan. 2, 2016, 20 pages.
International Search Report and Written Opinion for PCT Application No. PCT/US2015/028409, dated Aug. 19, 2015, 19 pages.
U.S. Appl. No. 14/566,053, filed Dec. 10, 2014, 41 pages.
U.S. Appl. No. 14/487,767, filed Sep. 16, 2014, 57 pages.
IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
ETSI TS 136 300 V11.3.0 (Nov. 2012); LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11); Nov. 2012, 217 pages.
Office Action for Taiwanese Patent Application No. 104114158, dated Sep. 22, 2016, 11 pages (Including 1 page of English translation).
Office Action for U.S. Appl. No. 14/487,767, dated Aug. 5, 2016, 24 pages.
Office Action for U.S. Appl. No. 14/566,053, dated Jul. 20, 2016, 16 pages.
Office Action for U.S. Appl. No. 14/566,053, dated Nov. 14, 2016, 13 pages.
Search Report for Taiwanese Patent Application No. 104114042 completed Oct. 6, 2016, 2 pages (1 page English Translation of Search Report).
International Preliminary Report on Patentability for PCT /US2015/ 029635, dated Dec. 22, 2016, 11 pages.
Advisory Action for U.S. Appl. No. 14/566,053, dated Feb. 8, 2017, 20 pages.
Office Action for U.S. Appl. No. 14/566,053, dated Jul. 7, 2017, 13 pages.
European Search Report for European Patent Application No. 15805733.1, dated Dec. 13, 2017, 8 pages.
Final Office Action for U.S. Appl. No. 14/566,053, dated Mar. 16, 2018, 13 pages.

* cited by examiner

APPARATUS, METHOD AND SYSTEM OF MULTI-USER DOWNLINK TRANSMISSION

CROSS REFERENCE

This application claims the benefit of and priority from U.S. Provisional Patent Application No. 62/009,789 entitled "Channel Reservation for Wi-Fi", filed Jun. 9, 2014, the entire disclosure of which is incorporated herein by reference.

TECHNICAL FIELD

Embodiments described herein generally relate to Multi-User (MU) downlink transmission.

BACKGROUND

Some wireless communication systems may communicate according to a multi-user (MU) communication scheme, in which a wireless communication device, e.g., an Access point (AP), may communicate MU transmissions with a group of wireless communication devices, e.g., wireless stations.

In one example, the MU transmissions may include, for example, a MU Multi-Input-Multi-Output (MU-MIMO) transmission, e.g., as defined by the IEEE 802.11ac Specification ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013).

In another example, the MU transmissions may include, for example, an Orthogonal Frequency-Division Multiple Access (OFDMA).

The AP may transmit a MU downlink transmission from the AP to the plurality of wireless stations, for example, when the AP detects that a wireless medium is clear.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
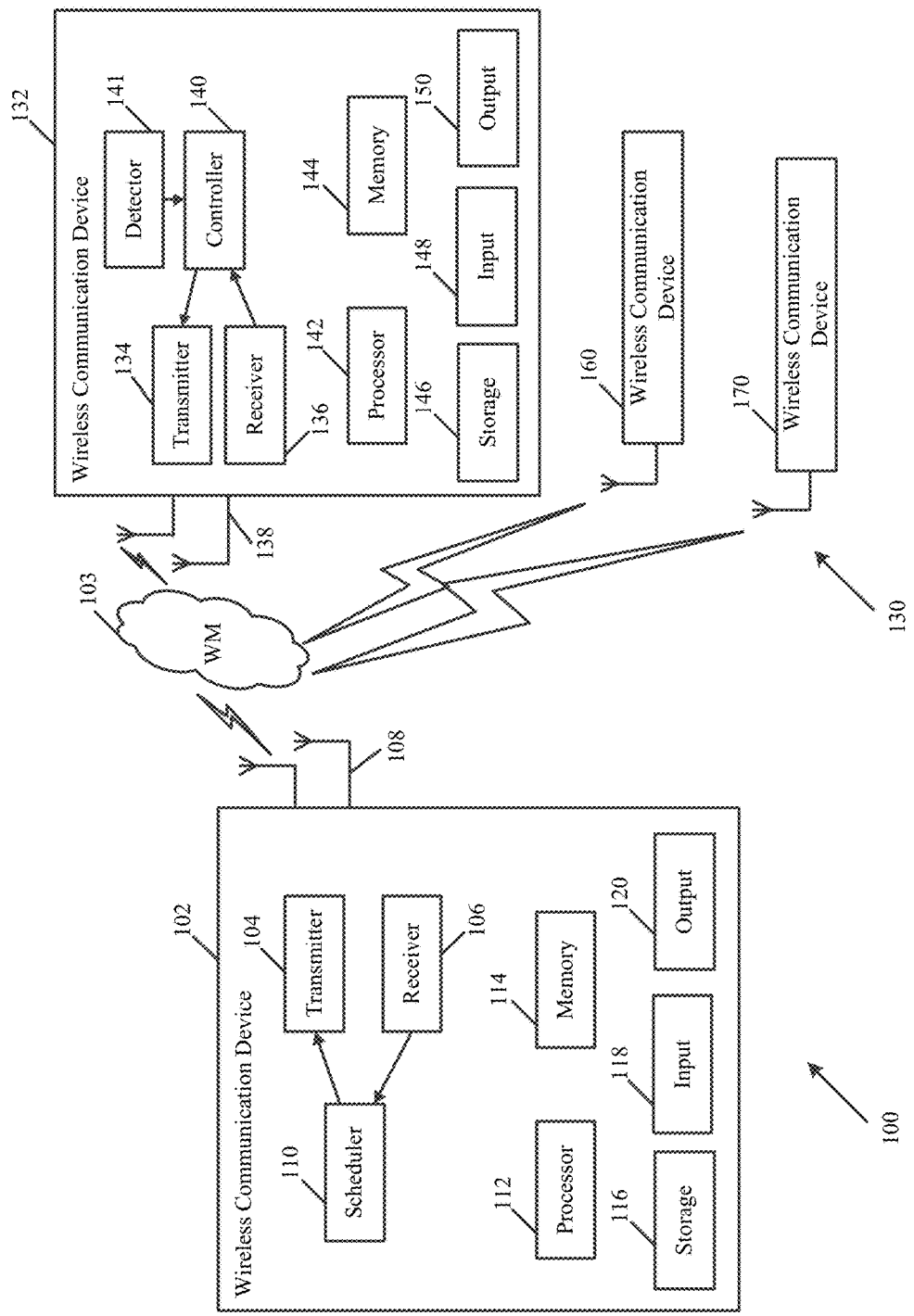
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The word "demonstrative" is used herein to mean "serving as a demonstration, an example, instance, or illustration". Any embodiment described herein as "demonstrative" is not necessarily to be construed as preferred or advantageous over other embodiments.

Some embodiments may be used in conjunction with various devices and systems, for example, a User Equipment (UE), a Mobile Device (MD), a wireless Station (STA), a communication station, an access terminal, a communication node, an Access Point (AP), an access node, a Personal Computer (PC), a desktop computer, a mobile computer, a laptop computer, a notebook computer, an Ultrabook™ computer, a tablet computer, a server computer, a handheld computer, a handheld device, a Personal Digital Assistant (PDA) device, a handheld PDA device, a Bluetooth (BT) device, a Bluetooth Low Energy (BLE) device, an on-board device, an off-board device, a hybrid device, a vehicular device, a non-vehicular device, a mobile or portable device, a consumer device, a non-mobile or non-portable device, a wireless communication station, a wireless communication device, a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013*"); *IEEE 802.11ad* (*"IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 December, 2012); and/or IEEE 802.11 ax (*High-Efficiency Wi-Fi (HEW)*) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.2, 2012*) and/or future versions and/or derivatives thereof, devices and/or networks operating in accordance with existing cellular specifications and/or protocols, e.g., 3rd Generation Partnership Project (3GPP), 3GPP Long Term Evolution (LTE) ("the LTE Standards) (including *ETSI TS 136 300 V11.3.0 (2012-11): LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11*), 2012), and/or future versions and/or derivatives thereof, units and/or devices which are part of the above networks, and the like.

Some embodiments may be used in conjunction with one way and/or two-way radio communication systems, multi-radio devices, cellular radio-telephone communication systems, a User Equipment (UE), a mobile device, a wireless station (STA), an access terminal, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a Mobile Internet Device (MID), or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), Multi-User (MU) MIMO (MU-MIMO), Single Carrier Frequency-Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), BT, BLE, Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a Wireless Fidelity (Wi-Fi or WiFi) network, or a WLAN according to the IEEE 802 Standards (also referred to as "the 802 network"). Other embodiments may be used in conjunction with any other suitable wireless communication network, for example, a wireless area network, a "piconet", a WPAN, a WVAN and the like.

Some demonstrative embodiments may be used in conjunction with a LTE cellular network. However, other embodiments may be used in conjunction with any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "substantially simultaneously" and "simultaneously", as used herein with reference to transmitting to two or more different wireless communication devices and/or receiving from two or more wireless communication devices, may refer to transmitting and/or receiving two or more transmissions, wherein at least a portion of each transmission and/or reception occurs at the same time, but does not imply that the different transmissions and/or receptions must start and/or end at the same time, although they may.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100 in accordance with some demonstrative embodiments.

In some demonstrative embodiments, system 100 may include a wireless communication network including one or more wireless communication devices, e.g., wireless communication devices 102, 132, 160, and/or 170, capable of communicating content, data, information and/or signals over a wireless medium 103.

In some demonstrative embodiments, wireless medium 103 may include, for example, a radio channel, a cellular channel, an RF channel, a WLAN channel, a Wireless Fidelity (WiFi) channel, an IR channel, and the like. One or more elements of system 100 may optionally be capable of communicating over any suitable wired communication links.

In some demonstrative embodiments, system 100 may include one or more non-AP stations, e.g., client STAs, and one or more APs. For example, device 102 may perform the functionality of an AP, e.g., a WiFi AP, an access node, a base station, a router, and the like; and wireless communication devices 132, 160 and/or 170 may perform the functionality of non-AP stations.

In some demonstrative embodiments, wireless communication device 102 may include a mobile or a non-mobile device, e.g., a static device.

In some demonstrative embodiments, wireless communication device 102 may include, for example, a node, an AP, an Access Controller (AC), a personal basic service set (PBSS) control point (PCP), a network controller, a Group Owner (GO), a network coordinator, a base station, a router, an access node, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, or the like.

In some demonstrative embodiments, wireless communication devices 132, 160, and/or 170 may include, for example, a User Equipment (UE), a Mobile Device (MD), a mobile station, an access terminal, an Internet of Things (IoT) device, a subscriber station, a High Data Rate (HDR) subscriber station, a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, wireless communication device 102 may also include, for example, a processor 112, an input unit 118, an output unit 120, a memory unit 114, and a storage unit 116; and/or wireless communication devices 132, 160 and/or 170 may also include, for example, a processor 142, an input unit 148, an output unit 150, a memory unit 144, and a storage unit 146. Wireless communication devices 102, 132, 160, and/or 170 may optionally include other suitable hardware components and/or software components. In some demonstrative embodiments, some or all of the components of wireless communication devices 102, 132, 160, and/or 170 may be enclosed in a common housing or packaging, and may be interconnected or operably associated using one or more wired or wireless links. In other embodiments, components of wireless communication devices 102, 132, 160, and/or 170 may be distributed among multiple or separate devices.

Processor 112 and/or processor 142 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. For example, processor 112 executes instructions, for example, of an Operating System (OS) of device 102 and/or of one or more suitable applications; and/or processor 142 executes instructions, for example, of an Operating System (OS) of device 132 and/or of one or more suitable applications.

Memory unit 114 and/or memory unit 144 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 and/or storage unit 146 may include, for example, a hard disk drive, a floppy disk drive, a Compact Disk (CD) drive, a CD-ROM drive, a DVD drive, or other suitable removable or non-removable storage units. For example, memory unit 114 and/or storage unit 116, for example, may store data processed by device 102; and/or memory unit 144 and/or storage unit 146, for example, may store data processed by device 132.

Input unit 118 and/or input unit 148 may include, for example, a keyboard, a keypad, a mouse, a touch-screen, a touch-pad, a track-ball, a stylus, a microphone, or other suitable pointing device or input device. Output unit 120 and/or output unit 150 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, wireless communication devices 102, 132, 160, and/or 170 may include wireless communication units to perform wireless communication between wireless communication devices 102, 132, 160, and/or 170 and/or with one or more other wireless communication devices. For example, wireless communication device 102 may include a transmitter (Tx) 104 and a receiver (Rx) 106; and/or wireless communication units 132, 160 and/or 170 may include a transmitter 134 and a receiver 136.

In some demonstrative embodiments, transmitter 104, receiver 106, transmitter 134, and/or receiver 136 may be configured to communicate wireless communication signals, RF signals, frames, blocks, transmission streams, messages, data items, and/or data. In one example, transmitter 104, receiver 106, transmitter 134, and/or receiver 136 may include circuitry, modulation elements, demodulation elements, amplifiers, analog to digital and/or digital to analog converters, filters, RF circuitry, BB circuitry, and/or the like. For example, transmitter 104, receiver 106, transmitter 134, and/or receiver 136 may include or may be implemented as part of a transceiver, a wireless Network Interface Card (NIC), and the like.

In some demonstrative embodiments, transmitter 104, receiver 106, transmitter 134, and/or receiver 136 may include, or may be associated with, one or more antennas. For example, transmitter 104 and/or receiver 106 may be associated with one or more antennas 108, e.g., a single antenna or two or more antennas; and/or transmitter 134, and/or receiver 136 may be associated with one or more antennas 138, e.g., a single antenna or two or more antennas.

Antennas 108 and/or 138 may include any type of antennas suitable for transmitting and/or receiving wireless communication signals, blocks, frames, transmission streams, messages and/or data. For example, antennas 108 and/or 138 may include any suitable configuration, structure and/or arrangement of one or more antenna elements, components, units, assemblies and/or arrays. Antennas 108 and/or 138 may include, for example, antennas suitable for directional communication, e.g., using beamforming techniques. For example, antennas 108 and/or 138 may include a phased array antenna, a multiple element antenna, a set of switched beam antennas, and/or the like. In some embodiments, antennas 108 and/or 138 may implement transmit and receive functionalities using separate transmit and receive antenna elements. In some embodiments, antennas 108 and/or 138 may implement transmit and receive functionalities using common and/or integrated transmit/receive elements.

In some demonstrative embodiments, transmitter 104 may be capable of simultaneously transmitting downlink (DL) transmissions to two or more other devices of system 100, e.g., two or more of devices 132, 160 and 170.

In some demonstrative embodiments, receiver 106 may be capable of simultaneously receiving uplink (UL) transmissions from two or more other devices of system 100, e.g., two or more of devices 132, 160 and 170.

In some demonstrative embodiments, wireless communication devices 102, 132, 160 and/or 170 may be capable of performing Multi-User (MU) communication. For example, transmitter 104 may transmit a MU downlink transmission by transmitting different signals substantially simultaneously to two or more of devices 132, 160 and 170. Receiver 106 may receive a MU uplink transmission by simultaneously receiving different signals from two or more of devices 132, 160 and 170.

In some demonstrative embodiments, the MU communication may include a MU-MIMO communication. For example, transmitter 104 may transmit a downlink MU-MIMO transmission to two or more of devices 132, 160 and 170. Receiver 106 may receive an uplink MU-MIMO transmission from two or more of devices 132, 160 and 170.

In some embodiments, wireless communication devices 102, 132, 160 and/or 170 may be capable of performing Spatial Division Multiple Access (SDMA) communication. For example, transmitter 104 may transmit a downlink SDMA transmission by transmitting different signals substantially simultaneously via antennas 108, for example, such that the combined transmitted signals result in different signals, which are to be received by two or more other wireless communication devices of system 100, being transmitted substantially in different directions, e.g., on the same frequency.

In some demonstrative embodiments, receiver 106 may receive an uplink SDMA transmission including different signals from two or more other devices of system 100.

In some demonstrative embodiments, the MU communication may include an OFDMA communication. For example, transmitter 104 may transmit a downlink OFDMA transmission to two or more of devices 132, 160 and 170. Receiver 106 may receive an uplink OFDMA transmission from two or more of devices 132, 160 and 170.

In other embodiments, the MU communication may include any other type of downlink and/or uplink MU communication.

In some demonstrative embodiments, wireless communication device 102 may communicate with at least one group ("the MU group") of a plurality of wireless communication devices of system 100, for example, a group 130 including two or more of devices 132, 160 and 170.

In some demonstrative embodiments, wireless communication device 102 may use a group identifier (ID) to communicate MU communications with the MU group 130, e.g., including two or more of devices 132, 160 and 170. For example, transmitter 104 may transmit to devices of the MU group a MU downlink transmission including the group ID of the MU group; and/or transmitter 134 of devices 132, 160 and/or 170 may transmit to device 102 a MU uplink transmission including the group ID of the MU group.

In some demonstrative embodiments, system 100 may perform the functionality of a HEW network.

In one example, device 102 may operate, for example, as a master station, e.g., a HEW master station, and devices 132, 160 and/or 170 may operate, for example, as non-master stations, e.g., HEW stations. The master station may be configured, for example, to contend for a wireless medium, e.g., during a contention period, to receive exclusive control of the medium for a control period, for example, a HEW control period, e.g., a transmission opportunity (TXOP). The master station may transmit, for example, an HEW master-sync transmission at the beginning of the HEW control period. During the HEW control period, the HEW stations may communicate with the master station, for example, in accordance with a non-contention based multiple access technique. During the HEW control period, the master station may communicate with HEW stations using one or more HEW frames. The multiple-access technique used during the HEW control period may be, for example, a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the links of an HEW frame may be configurable to have the same bandwidth, for example, one of 20 MHz, 40 MHz, or 80 MHz contiguous bandwidths, or an 80+80 MHz (160 MHz) non-contiguous bandwidth. In some embodiments, a 320 MHz contiguous bandwidth may be used. In some embodiments, bandwidths of 5 MHz and/or 10 MHz may also be used. In these embodiments, each link of an HEW frame may be configured for transmitting a number of spatial streams.

In other embodiments, one or more elements of system 100 may be configured to perform the functionality of any other network and/or to perform any other master and/or non-master functionality, over any other channels and/or frequencies, and/or using any other multiple-access technique.

In some demonstrative embodiments, wireless communication device 102 may include a scheduler 110 to schedule uplink MU and/or downlink MU communications between device 102 and devices 132, 160 and/or 170. In some demonstrative embodiments, scheduler 110 may include or may be implemented using suitable circuitry, e.g., processor circuitry, memory circuitry, Media-Access Control (MAC) circuitry, Physical Layer (PHY) circuitry, and/or any other circuitry, which may be configured to perform at least part of the functionality of scheduler 110. Additionally or alternatively, one or more functionalities of scheduler 110 may be implemented by logic, which may be executed by a machine and/or one or more processors, e.g., as described below.

In some demonstrative embodiments, scheduler 110 may be configured to schedule a MU downlink transmission from device 102 to devices 132, 160 and/or 170, for example, based on information relating to the downlink MU transmission, e.g., a size and/or type of data to be transmitted during the MU downlink transmission, channel conditions of one or more channels between device 102 and devices 132, 160, and/or 170, a prioritization of the devices 132, 160, and/or 170, and/or any other information pertaining to the MU downlink transmission.

In some demonstrative embodiments, scheduler 110 may be able to schedule a MU uplink transmission from devices 132, 160 and/or 170 to device 102, e.g., as described below.

In some demonstrative embodiments, the MU downlink transmission may be subject to interference, for example, even if device 102 detects that a wireless medium is clear, for example, if the location of one or more of the wireless stations is subject to interference from transmissions by one or more other devices, e.g., as described below.

Figure 2:
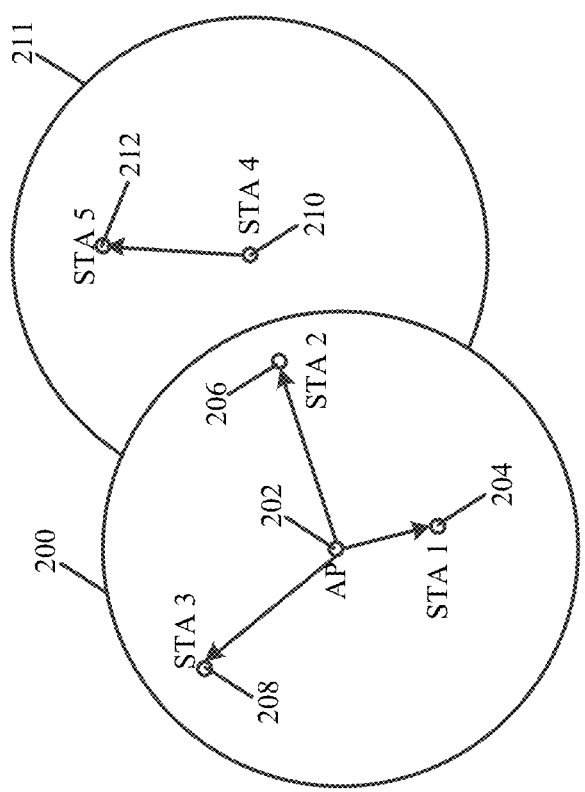
FIG. 2 is a schematic illustration of interference to a Multi-User (MU) downlink transmission, in accordance with some demonstrative embodiments.

Reference is made to FIG. 2, which schematically illustrates interference to a MU downlink transmission from an AP 202 to a plurality of wireless stations (STAs), including a first STA 204 (STA1), a second STA 206 (STA2), and a third STA 208 (STA3), in accordance with some demonstrative embodiments.

As shown in FIG. 2, AP 202 may have a coverage range 200. AP 202 may be able to determine whether or not a wireless medium is free, e.g., using a Clear Channel Assessment (CCA) mechanism or any other mechanism. The detection of the wireless medium at AP 202 may provide information, for example, only with respect to interfering transmissions, which may reach AP 202.

As shown in FIG. 2, a STA 210 (STA4), which may not belong to the group of wireless stations, may be out of coverage range 200. Accordingly, STA 210 may not be able to sense the MU downlink transmission from AP 202 and, as a result, STA 210 may transmit a transmission to a STA 212, e.g., during the MU downlink transmission from AP 202.

A coverage range 211 of STA 210 may partially overlap the coverage range of AP 200. For example, as shown in FIG. 2, the STA 206 may be within an overlap area covered by both coverage ranges 200 and 211. Due to the overlap between coverage areas 200 and 211, the transmission from STA 210 to STA 212 may reach STA 206, and may interfere with communications received at STA 206.

As shown in FIG. 2, AP 202 may be outside the coverage area 211. Therefore, AP 202 may not be aware of the transmission from STA 210 to STA 212. Accordingly, AP 202 may determine that the wireless medium is free, and may transit the MU downlink transmission to STAs 204, 206 and 208. However, the transmission from STA 210 to STA 212 may interfere with reception of the MU downlink transmission at STA 206.

In view of the above, there is a need to enable AP 202 to determine, e.g., prior to deciding to transmit the MU downlink transmission, whether or not the wireless medium is free at the wireless stations, which are to receive the MU downlink transmission, and/or to ensure, e.g., prior to deciding to transmit the MU downlink transmission, that the wireless medium is to be free during reception of the MU downlink transmission at the wireless stations.

The interference from STA 210 at STA 206 may severely affect throughput of the MU downlink transmission, for example, if the MU downlink transmission includes long packets, for example, aggregated packets, e.g., an Aggregated Mac Protocol Data Unit (A-MPDU). For example, the interference at STA 206 from STA 210 may result in about 50 percent decrease in throughput, for example, if the MU downlink transmission from AP 202 includes packets having a duration of 1 millisecond (ms) or more, e.g., 3-4 msec.

Referring back to FIG. 1, in some demonstrative embodiments devices 102, 132, 160 and/or 170 may be configured to enable devices 132, 160 and/or 170 to provide device 102 with an indication as to whether the wireless medium is sensed to be free at devices 132, 160 and/or 170, for example, prior to device 102 sending a MU downlink transmission, e.g., as described below.

In some demonstrative embodiments, device 102 may be configured to poll devices 132, 160, and/or 170, for example, prior to transmitting a downlink transmission, for example, the MU downlink transmission, to devices 132, 160, and/or 170, e.g., as described below.

In some demonstrative embodiments, a wireless station, e.g., device 132, may be configured to detect whether or not the wireless medium is free, and to respond to the poll from device 102, in a manner, which may indicate to device 102 whether or not the wireless medium is detected to be free at the wireless station.

In some demonstrative embodiments, device 102 may be configured to transmit the MU downlink transmission to wireless stations, which have indicated that the wireless medium is detected to be free, e.g., as described below.

In some demonstrative embodiments, devices 102, 132, 160 and/or 170 may be configured to implement a MU downlink channel reservation scheme configured to protect the reception of the MU downlink transmission, e.g., from interference, at devices 132, 160 and/or 170, e.g., as described below.

In some demonstrative embodiments, the MU downlink channel reservation scheme may be configured to enable devices 132, 160 and/or 170 to reserve the wireless medium, for example, for a duration covering at least the MU downlink transmission, e.g., as described below.

In some demonstrative embodiments, transmitter 104 may transmit a MU downlink request to a plurality of wireless stations, e.g., including devices 132, 160 and/or 170.

In some demonstrative embodiments, the MU downlink request may include a MU poll frame, for example, a downlink poll frame. In one example, transmitter 104 may transmit the MU downlink request in the form of, or as part of, a MU poll frame, e.g., a MU downlink poll frame, which may be addressed, for example, to the group address of the plurality of wireless stations.

In some demonstrative embodiments, the MU downlink request may include a trigger frame, e.g., a MU trigger frame.

In other embodiments, the MU downlink request may include, or may be transmitted as part of, any other dedicated or non-dedicated frame, e.g., as a piggyback on a data frame or any other frame.

In some demonstrative embodiments, one or more of the plurality of wireless stations may receive the MU downlink request. For example, receiver 136 may receive the downlink MU request at device 132.

In some demonstrative embodiments, one or more of the plurality of wireless stations may determine whether or not the wireless medium is free, e.g., upon receipt of the MU downlink request. For example, device 132 may include a detector 141 to detect whether or not the wireless medium is free, e.g., upon receipt of the MU downlink request at device 132.

In some demonstrative embodiments, detector 141 may detect whether or not the wireless medium is free according to a Clear Channel Assessment (CCA) mechanism, and/or any other channel assessment mechanism.

In some demonstrative embodiments, one or more of the plurality of wireless stations may respond to the MU downlink request, for example, only if the wireless medium is detected to be free. For example, transmitter 134 may transmit to device 102 a response to the MU downlink request, e.g., only if the wireless medium is detected to be free.

In some demonstrative embodiments, device 132 may include a controller 140 to control one or more communications between device 132 and device 102. For example, controller 140 may receive the MU downlink request from receiver 136, controller 140 may receive from detector 141 an indication to indicate whether or not the wireless medium is free, and/or controller 140 may control transmitter 134 to transmit the response to device 102, e.g., based on the indication from detector 141.

In some demonstrative embodiments, controller 140 may include or may be implemented using suitable circuitry, e.g., processor circuitry, memory circuitry, MAC circuitry, PHY circuitry, and/or any other circuitry, which may be configured to perform at least part of the functionality of controller 140. Additionally or alternatively, one or more functionalities of controller 140 may be implemented by logic, which may be executed by a machine and/or one or more processors, e.g., as described below.

In some demonstrative embodiments, the response may include a poll response, e.g., if the MU downlink request includes a MU poll frame. In other embodiments, the response may include any other message and/or frame.

Some demonstrative embodiments are described herein with respect to a wireless station, e.g., device 132, selecting between transmitting a response to the MU downlink request, e.g., to indicate to an AP, e.g., device 102, that the wireless medium is detected to be free, and not transmitting a response to the MU downlink request, e.g., to indicate to the AP that the wireless medium is not detected to be free. However, in other embodiments, any other indication may be implemented to indicate to the AP whether or not the wireless medium is detected to be free. In one example, device 132 may be configured to transmit to device 102 a response including an indicator, e.g., a bit, having a first value, e.g., one, to indicate the wireless medium is detected to be free, or a second value, e.g., zero, to indicate that the wireless medium is not detected to be free.

In some demonstrative embodiments, receiver 106 may receive one or more responses from one or more wireless stations of the plurality of wireless stations. For example, receiver 106 may receive the response from device 132, e.g., if detector 141 detects the wireless medium is free.

In some demonstrative embodiments, the receipt of a response from a wireless station, e.g., device 132, may indicate to device 102 that the wireless medium is detected to be free at the wireless station.

In some demonstrative embodiments, device 102 may send one or more additional MU downlink requests to one or more additional wireless stations, e.g., to stations of one or more other MU groups, for example, if no responses to the MU downlink request are received, or if the number of received responses is less than a predefined threshold. For example, sending the additional MU downlink requests may enable device 102 to detect an increased number of wireless stations to which the downlink transmission may be performed.

In some demonstrative embodiments, scheduler 110 may schedule a downlink transmission to at least one wireless station ("the scheduled station") of the one or more wireless stations, which have indicated the wireless medium to be free, e.g., one or more wireless stations from which the response is received at device 102.

In some demonstrative embodiments, scheduler 110 may schedule the downlink transmission only to devices, from which a response to the MU downlink request is received. For example, scheduler 110 may not schedule a downlink transmission to a wireless station, e.g., device 170, for example, if a response to the MU downlink request is not received from the wireless station, e.g., if device 102 does not receive from device 170 a response to the MU downlink request.

In some demonstrative embodiments, scheduler 110 may be configured to schedule the downlink transmission from device 102 to one or more of devices 132, 160 and/or 170, for example, based on information relating to the downlink transmission, e.g., a size and/or type of data to be transmitted during the downlink transmission, channel conditions of one or more channels between device 102 and devices 132, 160, and/or 170, a prioritization of the devices 132, 160, and/or 170, and/or any other information pertaining to the downlink transmission.

In some demonstrative embodiments, transmitter 104 may transmit a MU scheduling message indicating resources allocated for the downlink transmission to the at least one scheduled station.

In some demonstrative embodiments, transmitter 104 may transmit the MU scheduling message in the form of, or as part of, a downlink resource allocation map. In other embodiments, the MU scheduling message may include, or may be transmitted as part of, any other message or frame.

In some demonstrative embodiments, transmitter 104 may transmit the downlink transmission to the at least one scheduled station according to the MU scheduling message, e.g., as described below.

In some demonstrative embodiments, receiver 136 may receive the MU scheduling message, for example, subsequent to transmission of the response from device 132, e.g., as described below.

In some demonstrative embodiments, receiver 136 may receive the downlink transmission, for example, subsequent to the MU scheduling message, e.g., as described below.

In some demonstrative embodiments, the MU scheduling message may include a unicast message, which may be addressed to a single wireless station, for example, if the downlink transmission is to be scheduled to the single wireless station.

In some demonstrative embodiments, the MU scheduling message may be addressed to a plurality of wireless stations, for example, if the downlink transmission is to be scheduled to a plurality of wireless stations, e.g., as described below.

In some demonstrative embodiments, receiver 106 may receive two or more responses from two or more wireless stations.

In some demonstrative embodiments, scheduler 110 may schedule a downlink transmission to one or more scheduled stations of the two or more wireless stations, e.g., based on the two or more responses.

In some demonstrative embodiments, transmitter 104 may transmit a MU downlink transmission to a plurality of scheduled stations, e.g., including two or more of wireless communication devices 132, 160 and 170.

In some demonstrative embodiments, the MU downlink transmission may include a plurality of different downlink data transmissions simultaneously transmitted to the plurality of scheduled stations.

In one example, the MU downlink transmission may include a MU-MIMO downlink transmission, or an OFDMA downlink transmission.

In one example, device 102 may transmit the MU downlink request to devices 132, 160 and 170; device 132 may transmit a first response, e.g., to indicate the wireless medium is detected to be free at device 132; device 160 may transmit a second response, e.g., to indicate the wireless medium is detected to be free at device 160; and device 170 may not transmit a response, e.g., to indicate the wireless medium is not detected to be free at device 170.

According to this example, scheduler 110 may schedule a MU downlink transmission to devices 132 and 160, for example, based on the first and second responses, e.g., while not scheduling a downlink transmission for device 170. Transmitter 104 may transmit a MU scheduling message to inform devices 132 and 160 of downlink resources scheduled for devices 132 and 160.

In another example, device 102 may transmit a MU downlink request to devices 132, 160 and 170; device 132 may transmit a first response, e.g., to indicate the wireless medium is detected to be free at device 132; device 160 may transmit a second response, e.g., to indicate the wireless medium is detected to be free at device 160; and device 170 may transmit a third response, e.g., to indicate the wireless medium is detected to be free at device 170.

According to this example, scheduler 110 may schedule a MU downlink transmission to devices 132, 160 and 170, for example, based on the first, second, and third responses. Transmitter 104 may transmit a MU scheduling message to inform devices 132, 160 and 170 of the downlink transmission to devices 132, 160, and 170.

In some demonstrative embodiments, the MU scheduling message may include scheduling information to indicate downlink resources to be allocated for the downlink transmission.

In some demonstrative embodiments, the scheduling information may include, for example, timing information indicating a timing of the downlink transmission, frequency information indicating a frequency of the downlink transmission, transmit power information indicating a transmit power of the downlink transmission, and/or any other information.

For example, the scheduling information corresponding to the downlink transmission to device 132 may include timing information indicating a timing of the downlink transmission to device 132, frequency information indicating a frequency of the downlink transmission to device 132, transmit power information indicating a transmit power of the downlink transmission to device 132, and/or any other information.

In some demonstrative embodiments, devices 132, 160 and/or 170 may be configured to reserve the wireless medium, for example, to protect reception of the downlink transmission from device 102, e.g., as described below.

In some demonstrative embodiments, a wireless station, e.g., device 132, may be configured to reserve the wireless medium, for example, subsequent to receipt of the downlink scheduling message indicating a downlink transmission scheduled to be received by the wireless station, e.g., as described below.

In some demonstrative embodiments, the wireless station may transmit a reservation frame to reserve the wireless medium for at least a duration of the downlink transmission, e.g., subsequent to receipt of the MU scheduling message. For example, subsequent to receipt of the MU scheduling message from device 102, transmitter 134 may transmit a reservation frame to reserve the wireless medium for at least a duration of the downlink transmission.

In some demonstrative embodiments, the reservation frame may include a clear-to-send (CTS) frame. In other embodiments, the reservation frame may include any other frame configured to reserve the wireless medium, e.g., a frame including a duration, e.g., in the form of a Network Allocation vector (NAV) having a value corresponding to the duration to be reserved.

In some demonstrative embodiments, the reservation frame may reserve the wireless medium for a duration longer than the duration of the downlink transmission.

In one example, the reservation frame may reserve the wireless medium for a duration of the downlink transmission and a duration of an acknowledgement (ACK) of the downlink transmission, e.g., as described below.

In another example, the reservation frame may reserve the wireless medium for a duration of the downlink transmission and a duration of an uplink transmission to device 102, e.g., as described below.

Some demonstrative embodiments are described herein with respect to a system, e.g., system 100, including one or more wireless stations, e.g., devices 132, 160 and/or 170, configured to reserve the wireless medium for at least a duration of the downlink transmission, e.g., as described above. However, in other embodiments one or more wireless stations may optionally not reserve the wireless medium for the duration of the downlink transmission.

In some demonstrative embodiments, receiver 106 may receive at least one reservation frame from the at least one scheduled wireless station, for example, subsequent to transmission of the MU scheduling message, e.g., as described below. For example, receiver 106 may receive a CTS frame from device 132.

In some demonstrative embodiments, receiver 106 may receive reservation frames from each one of the scheduled wireless stations.

In other embodiments, receiver 106 may receive the reservation frame from only some of the scheduled wireless stations, or may not receive any reservation frame from any of the scheduled wireless stations.

In some demonstrative embodiments, receiver 106 may receive two or more identical reservation frames from two or more respective scheduled wireless stations. For example, devices 132, 160 and/or 170 may be configured to transmit identical CTS frames, e.g., using the same Modulation and Coding Scheme (MCS) and/or using a shared synchronized clock, e.g., as described below.

In some demonstrative embodiments, the MU downlink request may include a medium reservation duration to reserve the wireless medium for at least a time period between transmission of the MU downlink request and an end of the downlink transmission.

In some demonstrative embodiments, the MU downlink request may reserve the wireless medium for a duration longer than the duration of the downlink transmission.

In one example, the MU downlink request may reserve the wireless medium for a duration of the downlink transmission and a duration of an ACK of the downlink transmission, e.g., as described below.

In another example, the MU downlink request may reserve the wireless medium for a duration of the downlink transmission and a duration of an uplink transmission to device 102, e.g., as described below.

In another example, the MU downlink request may include a NAV covering a period from a beginning of the MU downlink request to an end of the poll response. According to this example, the NAV may expire automatically, e.g., if no response is received. If a response is received, the scheduling message and/or the downlink transmission may sent within short interframe space (SIFS) to hold the channel, e.g., since sending the scheduling message or the downlink transmission later than the SIFS, may enable another device to occupy the channel. According to this example, the scheduling message and/or the downlink transmission may include a new NAV, e.g., to cover a period to the end of the downlink transmission, or at least one ACK for the downlink transmission, e.g., as described below.

In another example, the MU downlink request may include a NAV covering a period from a beginning of the MU downlink request to an end of the downlink transmission, or at least one ACK for the downlink transmission. According to this example, device 102 may free the channel, for example, by sending a contention-free-end frame (CF-End), e.g., if no response is received, as described below.

In some demonstrative embodiments, scheduler 110 may schedule one or more uplink transmissions from devices 132, 160 and/or 170, for example, based on one or more uplink indications, e.g., as described below.

In some demonstrative embodiments, controller 140 may determine uplink resources of an uplink transmission from device 132 to device 102. For example, controller 140 may determine the uplink resources based on an amount of data pending transmission to device 102, a bandwidth for communicating the UL transmission from device 132 to device 102, channel conditions of a wireless channel between device 132 and device 102, and/or any other parameter and/or criterion.

In some demonstrative embodiments, transmitter 134 may transmit to device 102 an uplink indication.

In some demonstrative embodiments, the uplink indication may indicate the uplink resources requested by device 132. In other embodiments, the uplink indication may indicate whether or not device 132 requests uplink resources.

In some demonstrative embodiments, transmitter 134 may transmit the uplink indication as part of the response to the MU downlink request, e.g., as described below.

In some demonstrative embodiments, receiver 106 may receive from at least one wireless station of devices 132, 160 and/or 170 a response including an uplink indication indicating uplink resources requested by the wireless station. For example, receiver 106 may receive the response from device 132, including the uplink indication indicating the uplink resources requested by device 132.

In some demonstrative embodiments, scheduler 110 may schedule an uplink transmission from the at least one wireless station, e.g., from device 132, based on the uplink indication. For example, scheduler 110 may schedule the uplink transmission from device 132, based on a relationship between the requested uplink resources from device 132 and requested uplink resources from one or more other devices, e.g., devices 160 and/or 170; based on a relationship between the requested uplink resources from device 132 and a total amount of available uplink resources; based on an uplink priority assigned to device 132, e.g., relative to a priority of one or more other devices; based on channel conditions of the wireless channel between device 102 and device 132; and/or based on any other parameter and/or criterion.

In some demonstrative embodiments, transmitter 104 may transmit the MU scheduling message in the form of an uplink/downlink (UL/DL) scheduling message to indicate the downlink resources scheduled for the downlink transmission, and uplink resources allocated to one or more uplink transmissions from the one or more wireless stations, e.g., based on the uplink indications.

In some demonstrative embodiments, the uplink indication from a wireless station, e.g., device 132, may be included as part of the response to the MU downlink request, e.g., as part of the poll response; and/or the indication of the uplink resources may be transmitted to the wireless station as part of the MU scheduling message, e.g., the UL/DL scheduling message, as described below with reference to FIG. 5.

In other embodiments, the uplink indication may be communicated separately from the response, and/or the indication of the uplink resources may be communicated separately from the MU scheduling message. For example, transmitter 134 may transmit the uplink indication to device 102, as part of a dedicated UL poll response, for example, after receipt of the downlink transmission; and/or transmitter 104 may transmit an indication of the uplink resources scheduled to device 132 as part of a dedicated UL scheduling message, for example, after the downlink transmission, e.g., as described below with reference to FIG. 6.

Figure 3:
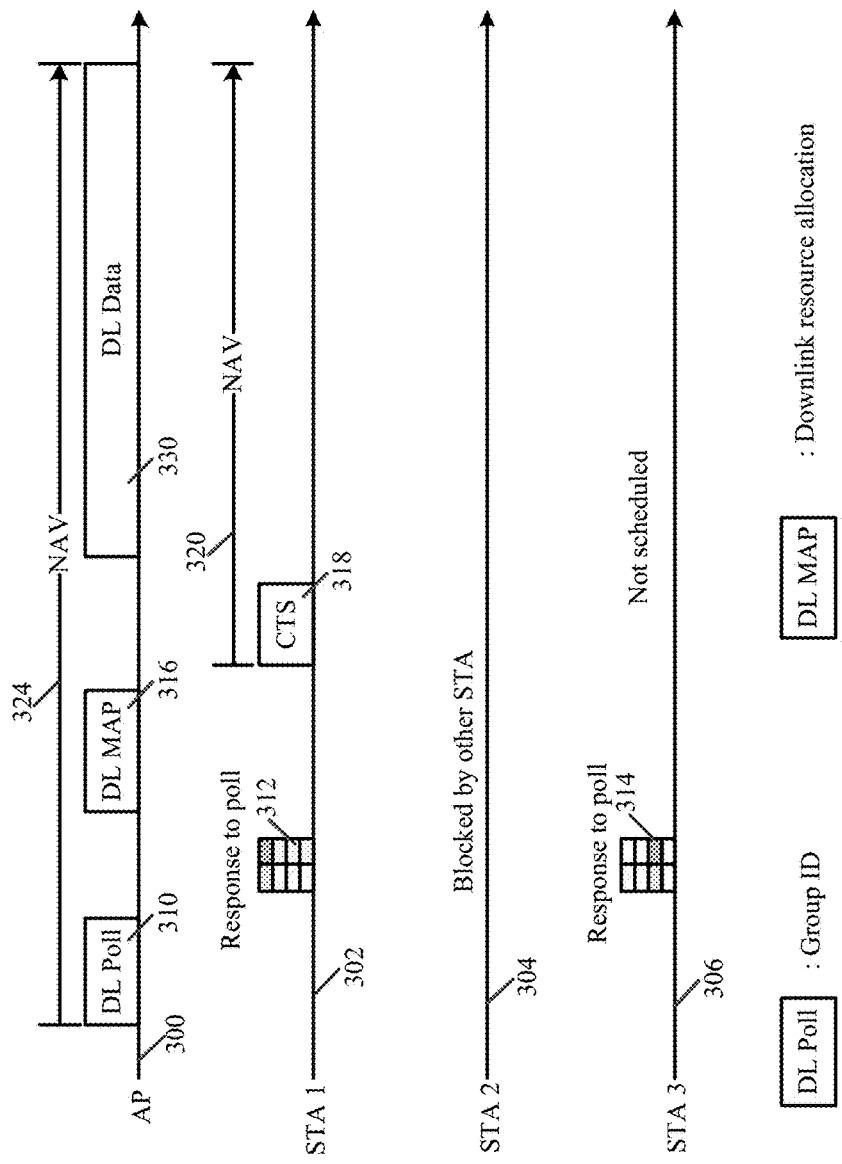
FIG. 3 is a schematic illustration of a sequence diagram of operations performed by an Access Point (AP) and a plurality of wireless stations, in accordance with some demonstrative embodiments.

Reference is made to FIG. 3, which schematically illustrates communications between an AP 300, a first wireless station (STA1) 302, a second wireless station (STA2) 304, and a third wireless station (STA3) 306, in accordance with some demonstrative embodiments. For example, AP 300 may perform the functionality of device 102 (FIG. 1), wireless station 302 may perform the functionality of device 132 (FIG. 1), wireless station 304 may perform the functionality of device 160 (FIG. 1), and/or wireless station 306 may perform the functionality of device 170 (FIG. 1).

In some demonstrative embodiments, AP 300 may inquire with one or more of STAs 302, 304, 306 regarding potential interference which may interfere with a downlink transmission from AP 300, e.g., as described below.

In some demonstrative embodiments, AP 300 may transmit to STAs 302, 304, and 306 a DL poll frame 310, e.g., to poll STAs 302, 304, and 306 regarding the CCA status of STAs 302, 304, and 306. For example, transmitter 104 (FIG. 1) may transmit DL poll frame 310 to STAs 302, 304 and/or 306. For example, DL poll frame 310 may perform the functionality of the MU downlink request, e.g., as described above.

In some demonstrative embodiments, DL poll frame 310 may reserve the wireless medium for a period 324 configured to protect a duration of a DL transmission 330, e.g., as described below. For example, DL poll frame 310 may include a NAV value corresponding to the duration 324.

In some demonstrative embodiments, DL poll frame 310 may be transmitted as a dedicated frame. In other embodiments, DL poll frame 310 may be piggybacked in a downlink packet, e.g., to reduce overhead.

In some demonstrative embodiments, STAs 302, 304, and 306 may receive DL poll frame 310. STAs 302, 304, and 306 may determine whether the wireless medium is idle or not, e.g., responsive to receipt of DL poll frame 310. For example, detector 141 (FIG. 1) may detect whether or not the wireless medium is free at device 132 (FIG. 1), e.g., as described above.

In some demonstrative embodiments, STAs 302 and 306 may detect an idle channel, while STA 304 may not detect an idle channel.

In some demonstrative embodiments, STA 302 may send a response 312 to AP 300, and STA 306 may send a response 314 to AP 300, while, for example, STA 304 may not send a response to AP 300, e.g., since STA 304 does not determine the wireless medium to be free.

In some demonstrative embodiments, responses 312 and 314 may include poll response frames, or any other response messages.

In some demonstrative embodiments, responses 312 and 314 be transmitted simultaneously, e.g., using a FDMA transmission scheme, a CDMA transmission scheme, or the like. In other embodiments, responses 312 and 314 may be sent sequentially in time, e.g., using a TDMA scheme, or the like.

In some demonstrative embodiments, AP 300 may receive responses 312 and 314. AP 300 may determine that the wireless medium may be free at STA 302 and STA 306, e.g., since responses 312 and 314 were received from STAs 302 and 306. AP 300 may determine that the wireless medium may not be free at STA 304, e.g., since a response is not received from STA 304.

In some demonstrative embodiments, AP 300 may select to schedule the downlink transmission 330 to one or more of the STAs, from which responses have been received. For example, scheduler 110 (FIG. 1) may select to schedule downlink transmission 330 to at least one of STAs 302 and 306, e.g., as described above.

In some demonstrative embodiments, AP 300 may select to schedule downlink transmission 330 only to STA 302, for example, if AP 300 has DL data ready for transmission for STA 302, e.g., and no DL data is ready for transmission to STA 306. The DL transmission 330 may be scheduled within period 324, e.g., such that DL transmission 330 is to end before the end of period 324.

In some demonstrative embodiments, AP 300 may transmit a downlink schedule, e.g., a DL schedule map 316, to schedule the DL transmission 330 to STA 302. For example, transmitter 104 (FIG. 1) may transmit DL map 316, e.g., as described above.

In some demonstrative embodiments, DL map 316 may include an indication of downlink resources for the downlink transmission 330 to STA 302.

In some demonstrative embodiments, STA 302 may receive DL map 316 and may determine the duration of the DL transmission 330, e.g., based on the DL map 316.

In some demonstrative embodiments, STA 302 may reserve the wireless medium for a period 320 including the duration of the downlink transmission 330. For example, STA 302 may transmit a CTS frame 318 having a NAV value corresponding to the period 320.

In some demonstrative embodiments, AP 300 may transmit the downlink transmission 330 to STA 302.

As shown in FIG. 3, in some embodiments an acknowledgement, e.g., an ACK or a block acknowledgement (BACK), to the downlink transmission 330 is not scheduled during the period 324. For example, AP 300 may ask for the ACK or BACK later, e.g., using a BACK Request frame.

Figure 4:
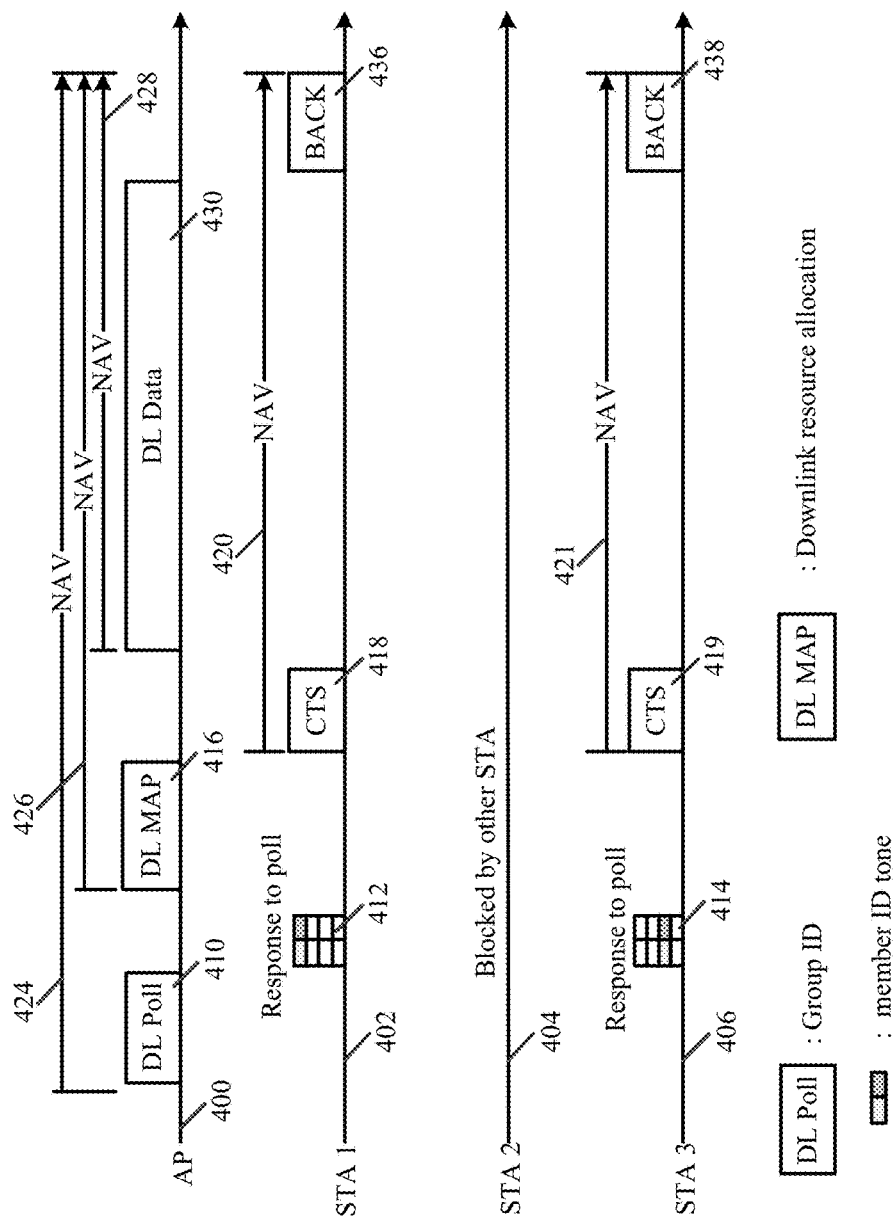
FIG. 4 is a schematic illustration of a sequence diagram of operations performed by an AP and a plurality of wireless stations, in accordance with some demonstrative embodiments.

Reference is made to FIG. 4, which schematically illustrates communications between an AP 400, a first wireless station (STA1) 402, a second wireless station (STA2) 404, and a third wireless station (STA3) 406, in accordance with some demonstrative embodiments. For example, AP 400 may perform the functionality of device 102 (FIG. 1), wireless station 402 may perform the functionality of device 132 (FIG. 1), wireless station 404 may perform the functionality of device 160 (FIG. 1), and/or wireless station 406 may perform the functionality of device 170 (FIG. 1).

In some demonstrative embodiments, AP 400 may inquire with one or more of STAs 402, 404, 406 regarding potential interference, which may interfere with a downlink transmission from AP 400.

In some demonstrative embodiments, AP 400 may transmit to STAs 402, 404, and 406 a DL poll frame 410, e.g., to poll STAs 402, 404, and 406 regarding the CCA status of STAs 402, 404, and 406. For example, transmitter 104 (FIG. 1) may transmit DL poll frame 410 to STAs 402, 404 and/or 406.

In some demonstrative embodiments, DL poll frame 410 may reserve the wireless medium for a period 424 configured to protect a duration of a DL transmission 430, e.g., as described below. For example, DL poll frame 410 may include a NAV value corresponding to the duration of period 424.

In some demonstrative embodiments, period 424 may be configured to protect a duration of one or more BACK messages to acknowledge receipt of the DL transmission 430, e.g., as described below.

In some demonstrative embodiments, DL poll frame 410 may be transmitted as a dedicated frame. In other embodiments, DL poll frame 410 may be piggybacked in a downlink packet, e.g., to reduce overhead.

In some demonstrative embodiments, STAs 402, 404, and 406 may receive DL poll frame 410. STAs 402, 404, and 406 may determine whether the wireless medium is idle or not, e.g., responsive to receipt of DL poll frame 410. For example, detector 141 (FIG. 1) may detect whether or not the wireless medium is free at device 132 (FIG. 1), e.g., as described above.

In some demonstrative embodiments, STAs 402 and 406 may detect an idle channel, while STA 404 may not detect an idle channel.

In some demonstrative embodiments, STA 402 may send a response 412 to AP 400, and STA 406 may send a response 414 to AP 400, while, for example, STA 404 may not send a response to AP 400, e.g., since STA 404 did not determine the wireless medium to be free.

In some demonstrative embodiments, responses 412 and 414 may include poll response frames, or any other response messages.

In some demonstrative embodiments, responses 412 and 414 may be transmitted simultaneously, e.g., using a FDMA transmission scheme, a CDMA transmission scheme, or the like. In other embodiments, responses 412 and 414 may be sent sequentially in time, e.g., using a TDMA scheme, or the like.

In some demonstrative embodiments, AP 400 may receive responses 412 and 414. AP 400 may determine that the wireless medium may be free at STA 402 and STA 406, e.g., since responses 412 and 414 were received from STAs 402 and 406. AP 400 may determine that the wireless medium may not be free at STA 404, e.g., since a response is not received from STA 404.

In some demonstrative embodiments, AP 400 may free the reservation of the wireless medium, for example, by transmitting a Contention-Free-End (CF-End) frame, e.g., if no response to DL poll frame 410 is received from any of the STAs 402, 404 and 406.

In some demonstrative embodiments, AP 400 may select to schedule the downlink transmission 430 to one or more of the STAs, from which responses have been received. For example, scheduler 110 (FIG. 1) may select to schedule downlink transmission 430 to at least one of STAs 402 and 406, e.g., as described above.

In some demonstrative embodiments, AP 400 may select to schedule downlink transmission 430 to both STAs 402 and 406, for example, if AP 400 has DL data ready for transmission for both STAs 402 and 406. The DL transmission 430 may be scheduled within period 424, e.g., such that DL transmission 430 is to end before the end of period 424.

In some demonstrative embodiments, AP 400 may transmit a downlink schedule, e.g., a DL schedule map 416, to schedule the DL transmission 430 to STA 402 and STA 406. For example, transmitter 104 (FIG. 1) may transmit DL map 416, e.g., as described above.

In some demonstrative embodiments, DL map 416 may include an indication of downlink resources for the downlink transmission 430 to STA 402 and STA 406.

In some demonstrative embodiments, DL map 416 may reserve the wireless medium for a period 426 configured to protect a duration of DL transmission 430. For example, DL map 416 may include a NAV value corresponding to the duration of period 426.

In some demonstrative embodiments, DL map 416 may schedule for STA 402 a BACK 436 to acknowledge receipt of DL transmission 430 at STA 402, and/or DL map 416 may schedule for STA 406 a BACK 438 to acknowledge receipt of DL transmission 430 at STA 406.

In some demonstrative embodiments, period 426 may be configured to protect the duration of BACK 436 and/or BACK 438.

In some demonstrative embodiments, STAs 402 and 406 may receive DL map 416 and determine the duration of the DL transmission 430, e.g., based on the DL map 416.

In some demonstrative embodiments, STA 402 may reserve the wireless medium for a period 420 including the duration of the downlink transmission 430. For example, STA 402 may transmit a CTS frame 418 having a NAV value corresponding to the duration of period 420.

In some demonstrative embodiments, period 420 may be configured to protect BACK 436.

In some demonstrative embodiments, STA 406 may reserve the wireless medium for a period 421 including the duration of the downlink transmission 430. For example, STA 406 may transmit a CTS frame 419 having a NAV value corresponding to the duration of period 421.

In some demonstrative embodiments, period 421 may be configured to protect BACK 438.

In some demonstrative embodiments, AP 400 may schedule CTS frames 418 and 419 to be transmitted sequentially in time, e.g., to avoid collision between CTS frames 418 and 419. For example, DL poll 410 and/or DL map 416 may include information defining the scheduling of CTS frames 418 and 419, e.g., information defining an order and/or a timing of transmitting CTS frames 418 and 419.

In some demonstrative embodiments, CTS frames 418 and 419 may be transmitted substantially simultaneously, for example, if the durations of the downlink data transmissions to STAs 402 and 406 are comparable, e.g., as described below.

In some demonstrative embodiments, physically transmitted signals both the CTS frames 418 and 419 may be identical. For example, CTS frames 418 and 419 may share the same MCS.

In some demonstrative embodiments, STA 402 and STA 406 may be configured to set one or more transmission parameters of CTS frames 418 and 419, e.g., a carrier frequency, a sampling clock, a duration field, and/or a transmission timing, for example, according to corresponding transmission parameters indicated by AP 400, e.g., via downlink poll 410 and/or DL map 416.

In some demonstrative embodiments, STAs 404 and 406 may detect clock and timing information of AP 400, e.g., from DL poll 410 and/or DL map 416. STAs 404 and 406 may use the detected clock and timing information to correct a clock and a timing, e.g., such that the transmitted signals of CTS frames 418 and 419 may have the same carrier frequency, sampling clock, and symbol timing.

In some demonstrative embodiments, the transmission of the identical CTS frames 418 and 419 may result in superimposed signals from the CTS frames 418 and 419 STAs being detected by other devices, e.g., as if they are delayed signals from channel multipath.

In some demonstrative embodiments, AP 400 may transmit the downlink transmission 430 to STA 402 and STA 406, e.g., in the form of a MU DL transmission.

In some demonstrative embodiments, STA 402 may transmit BACK 436, e.g., to acknowledge receipt of downlink transmission 430; and/or STA 406 may transmit BACK 438, e.g., to acknowledge receipt of downlink transmission 430. BACK 436 and 438 may be sent simultaneously, e.g., as shown in FIG. 4. Alternatively, BACK 436 and 438 may be sent sequentially.

Figure 5:
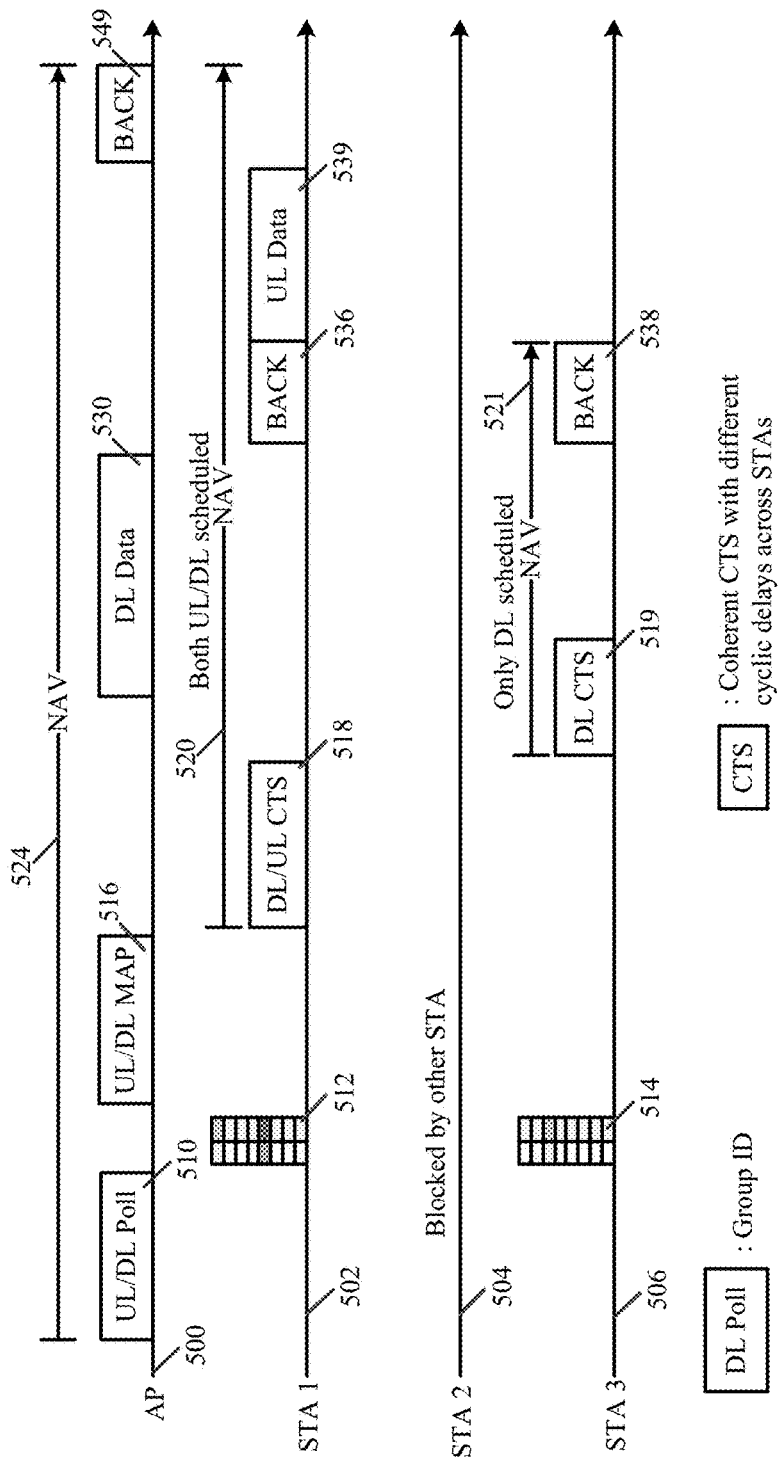
FIG. 5 is a schematic illustration of a sequence diagram of operations performed by an AP and a plurality of wireless stations, in accordance with some demonstrative embodiments.

Reference is made to FIG. 5, which schematically illustrates communications between an AP 500, a first wireless station (STA1) 502, a second wireless station (STA2) 504, and a third wireless station (STA3) 506, in accordance with some demonstrative embodiments. For example, AP 500 may perform the functionality of device 102 (FIG. 1), wireless station 502 may perform the functionality of device 132 (FIG. 1), wireless station 504 may perform the functionality of device 160 (FIG. 1), and/or wireless station 506 may perform the functionality of device 170 (FIG. 1).

In some demonstrative embodiments, AP 500 may inquire with one or more of STAs 502, 504, 506 regarding potential interference, which may interfere with a downlink transmission from AP 500.

In some demonstrative embodiments, AP 500 may transmit to STAs 502, 504, and 506 a DL/UL poll frame 510, e.g., to poll STAs 502, 504, and 506 regarding the CCA status of STAs 502, 504, and 506; and to poll STAs 502, 504, and 506 for requested uplink resources. For example, transmitter 104 (FIG. 1) may transmit DL/UL poll frame 510 to STAs 502, 504 and/or 506.

In some demonstrative embodiments, DL/UL poll frame 510 may reserve the wireless medium for a period 524 configured to protect a duration of a DL transmission 530, e.g., as described below. For example, DL/UL poll frame 510 may include a NAV value corresponding to the duration of period 524.

In some demonstrative embodiments, period 524 may be configured to protect a duration of one or more BACK messages to acknowledge receipt of the DL transmission 530, e.g., as described below.

In some demonstrative embodiments, period 524 may be configured to protect a duration of one or more uplink transmissions from STAs 502, 504 and/or 506 to AP 500, e.g., as described below.

In some demonstrative embodiments, DL/UL poll frame 510 may be transmitted as a dedicated frame. In other embodiments, DL/UL poll frame 510 may be piggybacked in a downlink packet, e.g., to reduce overhead.

In some demonstrative embodiments, DL/UL poll frame 510 may enable AP 500 to poll STAs 502, 504 and 506 for both DL and UL availability, e.g., using a combined, single, poll request.

In some demonstrative embodiments, DL/UL poll frame 510 may enable AP 500 to schedule both the DL and UL transmissions, for example, during one burst of transmission and/or using one resource allocation map, e.g., as described below.

In some demonstrative embodiments, implementing the DL/UL poll frame 510 may enable to reduce channel training overhead, and/or to reduce transmit/receive turnaround time.

In some demonstrative embodiments, STAs 502, 504, and 506 may receive DL/UL poll frame 510. STAs 502, 504, and 506 may determine whether the wireless medium is idle or not, e.g., responsive to receipt of DL/UL poll frame 510. For example, detector 141 (FIG. 1) may detect whether or not the wireless medium is free at device 132 (FIG. 1), e.g., as described above.

In some demonstrative embodiments, STAs 502 and 506 may detect an idle channel, while STA 504 may not detect an idle channel.

In some demonstrative embodiments, STA 502 may send a response 512 to AP 500, and STA 506 may send a response 514 to AP 500, while, for example, STA 504 may not send a response to AP 500, e.g., since STA 504 did not determine the wireless medium to be free.

In some demonstrative embodiments, responses 512 and 514 may include poll response frames, or any other response messages.

In some demonstrative embodiments, responses 512 and 514 may be transmitted simultaneously, e.g., using a FDMA transmission scheme, a CDMA transmission scheme, or the like. In other embodiments, responses 512 and 514 may be sent sequentially in time, e.g., using a TDMA scheme, or the like.

In some demonstrative embodiments, STA 502 may have UL data to be transmitted to AP 500, while STA 506 may not have UL data to be transmitted to AP 500. According to these embodiments, response 512 may include an uplink indication to indicate STA 502 requests UL resources, while response 514 may not indicate a request for uplink resources.

In some demonstrative embodiments, AP 500 may receive responses 512 and 514. AP 500 may determine that the wireless medium may be free at STA 502 and STA 506, e.g., since responses 512 and 514 were received from STAs 502 and 506. AP 500 may determine that the wireless medium may not be free at STA 504, e.g., since a response is not received from STA 504.

In some demonstrative embodiments, AP 500 may free the reservation of the wireless medium, for example, by transmitting a CFE frame, e.g., if no response to DL/UL poll frame 510 is received from any of the STAs 502, 504 and 506.

In some demonstrative embodiments, AP 500 may select to schedule the downlink transmission 530 to one or more of the STAs, from which responses have been received. For example, scheduler 110 (FIG. 1) may select to schedule downlink transmission 530 to at least one of STAs 502 and 506, e.g., as described above.

In some demonstrative embodiments, AP 500 may select to schedule downlink transmission 530 to both STAs 502 and 506, for example, if AP 500 has DL data ready for transmission for both STAs 502 and 506. The DL transmission 530 may be scheduled within period 524, e.g., such that DL transmission 530 is to end before the end of period 524.

In some demonstrative embodiments, AP 500 may also schedule uplink resources for an uplink transmission from STA 502, e.g., based on the UL resources requested by STA 502.

In some demonstrative embodiments, AP 500 may transmit a downlink/uplink schedule, e.g., a DL/UL schedule map 516, to schedule the DL transmission 530 to STA 502 and STA 506, and to schedule an UL transmission 539 to STA 502. For example, transmitter 104 (FIG. 1) may transmit DL/UL map 516, e.g., as described above.

In some demonstrative embodiments, DL/UL map 516 may include an indication of downlink resources for the downlink transmission 530 to STA 502 and STA 506, and an indication of uplink resources for the uplink transmission 539 from STA 506.

In some demonstrative embodiments, DL/UL map 516 may schedule for STA 502 a BACK 536 to acknowledge receipt of DL transmission 530 at STA 502; DL/UL map 516 may schedule for STA 506 a BACK 538 to acknowledge receipt of DL transmission 530 at STA 506; and/or DL/UL map 516 may schedule for uplink transmission 539 from STA 502, e.g., following BACK 536 and/or BACK 538.

In some demonstrative embodiments, period 524 may be configured to protect the duration of BACK 536, BACK 538, UL transmission 539, and a BACK 549 from AP 500 to acknowledge receipt of UL transmission 539.

In some demonstrative embodiments, STAs 502 and 506 may receive DL/UL map 516 and determine the duration of the DL transmission 530, e.g., based on the DL/UL map 516. STA 502 may also determine the timing and duration of UL transmission 539, e.g., based on the DL/UL map 516.

In some demonstrative embodiments, STA 502 may reserve the wireless medium for a period 520 including the duration of the downlink transmission 530, BACK 536, and UL transmission 539. For example, STA 502 may transmit a CTS frame 518 having a NAV value corresponding to the duration of period 520.

In some demonstrative embodiments, STA 506 may reserve the wireless medium for a period 521 including the duration of the downlink transmission 530, and BACK 538. For example, STA 506 may transmit a CTS frame 519 having a NAV value corresponding to the duration of period 521.

In some demonstrative embodiments, AP 500 may schedule CTS frames 518 and 519 to be transmitted sequentially in time, e.g., to avoid collision between CTS frames 518 and 519. For example, DL/UL poll 510 and/or DL/UL map 516 may include information defining the scheduling of CTS frames 518 and 519, e.g., information defining an order and/or a timing of transmitting CTS frames 518 and 519.

In some demonstrative embodiments, DL/UL poll 510 and/or DL/UL map 516 may schedule transmission of CTS frame 518 substantially simultaneously with one or more other CTS frames (not shown in FIG. 5) from one or more other stations having both downlink and uplink transmissions scheduled. For example, AP 500 may schedule a first CTS batch including identical CTS frames from all stations having both downlink and uplink transmissions scheduled. The CTS frames of the first CTS batch may be transmitted simultaneously, e.g., as described above with reference to FIG. 4.

In some demonstrative embodiments, DL/UL poll 510 and/or DL/UL map 516 may schedule transmission of CTS frame 519 substantially simultaneously with one or more other CTS frames (not shown in FIG. 5) from one or more other stations having only downlink transmissions scheduled. For example, AP 500 may schedule a second CTS batch including identical CTS frames from all stations having only downlink transmissions scheduled. The CTS frames of the second CTS batch may be transmitted simultaneously, e.g., as described above with reference to FIG. 4.

In some demonstrative embodiments, AP 500 may transmit the downlink transmission 530 to STA 502 and STA 506, e.g., in the form of a MU DL transmission.

In some demonstrative embodiments, STA 502 may transmit BACK 536, e.g., to acknowledge receipt of downlink transmission 530; and/or STA 506 may transmit BACK 538, e.g., to acknowledge receipt of downlink transmission 530. BACK 536 and 538 may be sent simultaneously, e.g., as shown in FIG. 5. Alternatively, BACK 536 and 538 may be sent sequentially. In another example, STA 506 may delay BACK, e.g., until receiving a BACK request from AP 500.

In some demonstrative embodiments, STA 502 may transmit UL transmission 539 to AP 500, e.g., subsequent to transmission of BACK 536. AP 500 may transmit BACK 549 to STA 502, e.g., to acknowledge receipt of uplink transmission 539.

In some demonstrative embodiments, BACK 536 may be piggybacked in uplink transmission 539. In other embodiments, the BACK and uplink transmissions may be separate.

Some demonstrative embodiments are described herein with respect to scheduling an uplink transmission, e.g., uplink transmission 539, subsequent to downlink transmission, e.g., downlink transmission 530. However, in other embodiments, the uplink transmission may be scheduled prior to the downlink transmission.

Figure 6:
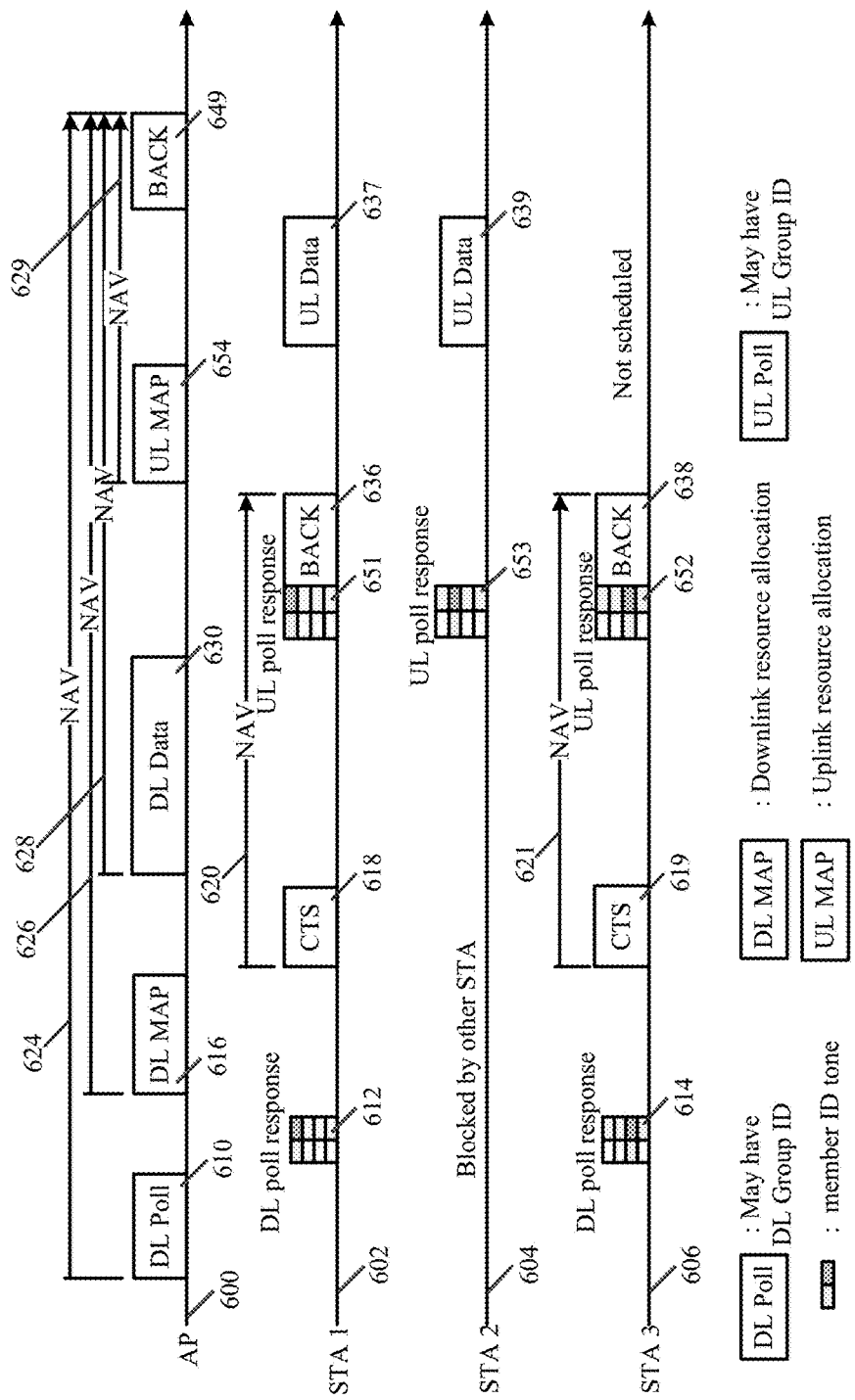
FIG. 6 is a schematic illustration of a sequence diagram of operations performed by an AP and a plurality of wireless stations, in accordance with some demonstrative embodiments.

Reference is made to FIG. 6, which schematically illustrates communications between an AP 600, a first wireless station (STA1) 602, a second wireless station (STA2) 604, and a third wireless station (STA3) 606, in accordance with some demonstrative embodiments. For example, AP 600 may perform the functionality of device 102 (FIG. 1), wireless station 602 may perform the functionality of device 132 (FIG. 1), wireless station 604 may perform the functionality of device 160 (FIG. 1), and/or wireless station 606 may perform the functionality of device 170 (FIG. 1).

In some demonstrative embodiments, AP 600 may transmit to STAs 602, 604 and 606 a DL poll frame 610, may receive a DL poll response 612 from STA 602, may receive a DL poll response 614 from SAT 606, and may transmit DL map frame 616 to schedule a MU DL transmission 630 to STA 602 and 606, e.g., as described above with reference to FIG. 4.

In some demonstrative embodiments, STAs 602 and 606 may receive DL map 616 and determine the duration of the DL transmission 630, e.g., based on the DL map 616.

In some demonstrative embodiments, STA 602 may reserve the wireless medium for a period 620 including the duration of the downlink transmission 630. For example, STA 602 may transmit a CTS frame 618 having a NAV value corresponding to the duration of period 620.

In some demonstrative embodiments, STA 606 may reserve the wireless medium for a period 621 including the duration of the downlink transmission 630. For example, STA 606 may transmit a CTS frame 619 having a NAV value corresponding to the duration of period 621.

In some demonstrative embodiments, CTS frames 618 and 619 may be transmitted substantially simultaneously, for example, if the durations of the downlink data transmissions to STAs 602 and 606 are comparable, e.g., as described above with reference to FIG. 4. In other embodiments, AP 600 may schedule CTS frames 618 and 619 to be transmitted sequentially in time, e.g., to avoid collision between CTS frames 618 and 619.

In some demonstrative embodiments, AP 600 may separately schedule downlink transmission 630 and one or more uplink transmissions from STAs 602, 604 and/or 606, for example, within one transmission opportunity (TXOP).

In some demonstrative embodiments, downlink transmission 630 may be scheduled before the uplink transmissions, e.g., as shown in FIG. 6. In other embodiments, the uplink transmissions may be scheduled before downlink transmission 630.

In some demonstrative embodiments, AP 600 may send an uplink poll to poll STAs 602, 604 and 606 for requested uplink resources. The uplink poll may be, for example, piggybacked by a physical layer packet carrying the DL Poll 610 and/or the DL map 616. For example, the uplink poll may be piggybacked by the physical layer packet carrying the DL Poll 610, e.g., if DL map 616 sent in a beamformed manner.

In some demonstrative embodiments, the UL poll may specify a group of STAs, e.g., including STAs 602, 604 and/or 606, to send poll responses at a specified time, e.g., subsequent to DL transmission 630, or any other time before or after DL transmission 630, e.g., before or after acknowledgement of the DL transmission 630.

In some demonstrative embodiments, AP 600 may receive one or more poll responses from one or more of stations 602, 604, and 606.

In some demonstrative embodiments, AP 600 may receive an UL poll response from a station, e.g., even if a DL poll response to DL poll 610 is not received from the station. For example, as shown in FIG. 6, STA 602 may send an UL poll response 651 to AP 600, STA 606 may send an UL poll response 652 to AP 600, and STA 604 may send an UL poll response 653 to AP 600, e.g., even if STA 604 did not send a response to DL poll 610.

In some demonstrative embodiments, AP 600 may schedule transmission of poll responses 651, 652 and/or 653 before transmission of one or more acknowledgements of downlink transmission 630, e.g., a BACK 636 from STA 602 and/or a BACK 638 from STA 606, for example, in order to provide STAs 602, 604 and/or 606 an increased amount of time to decode the downlink data 630, e.g., compared to sending the poll responses after the acknowledgements. According to these embodiments, a time spacing between the uplink poll responses 651, 652 and/or 653 and the termination of the downlink transmission 630 may even be shorter than a Short-Inter-Frame-Space (SIFS), e.g., 16 microseconds (us).

In some demonstrative embodiments, the time spacing between the poll response 651 and BACK 636, and/or the time spacing between UL poll response 652 and BACK 638 may even be shorter than the SIFS or may even be removed, e.g., AP 600 may already be in a receive mode after receiving the uplink poll responses 651, 652 and 653.

In some demonstrative embodiments, STA 602 may set period 620 to cover the duration of UL poll response 651 and BACK 636; and/or STA 606 may set period 621 to cover the duration of UL poll response 652 and BACK 638.

In some demonstrative embodiments, AP 600 may determine to schedule uplink transmissions from STA 602 and STA 604, for example, while not scheduling an uplink transmission from STA 606, e.g., if poll response 652 indicates no uplink resources are requested by STA 606 and/or if AP 600 decides not to schedule uplink resources to STA 606 for any other reason.

In some demonstrative embodiments, AP 600 may transmit an UL map 654 including an indication of uplink resources scheduled for STAs 602 and 604, e.g., subsequent to receiving BACK 636 and BACK 638.

In some demonstrative embodiments, STA 602 may transmit an UL transmission 637 to AP, and STA 604 may transmit an UL transmission 639 to AP 600, e.g., according to the uplink resources scheduled by UL map 654.

In some demonstrative embodiments, UL transmissions 637 and 639 may be transmitted in the form of a MU-MIMO UL transmission, or an OFDMA UL transmission.

In some demonstrative embodiments, AP 600 may transmit a BACK 649 to acknowledge UL transmissions 637 and 639.

In some demonstrative embodiments, DL poll frame 610 may reserve the wireless medium for a period 624, DL map frame 616 may reserve the wireless medium for a period 626, DL transmission 630 may reserve the wireless medium for a period 628, and/or UL map 654 may reserve the wireless medium for a period 629.

In some demonstrative embodiments, AP 600 may set period 624, period 626, period 628 and/or period 630 to end at an end of BACK 649.

Figure 7:
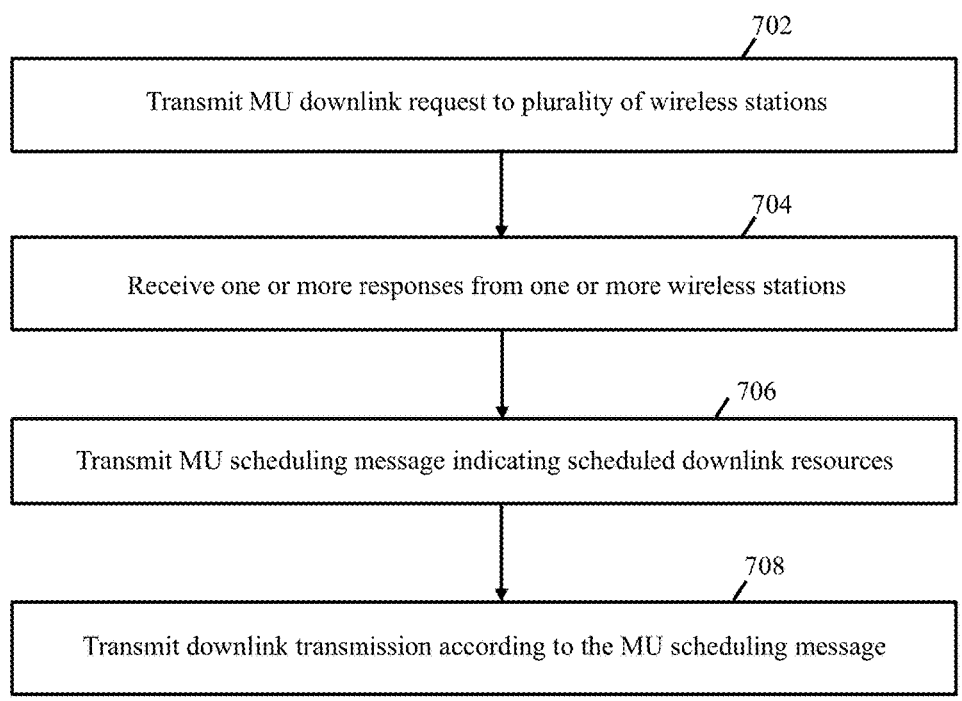
FIG. 7 is a schematic flow-chart illustration of a method of multi-user downlink transmission, in accordance with some demonstrative embodiments.

Reference is made to FIG. 7, which schematically illustrates a method of MU downlink transmission, in accordance with some demonstrative embodiments. In some demonstrative embodiments, one or more of the operations of the method of FIG. 7 may be performed by one or more elements of a system, e.g., system 100 (FIG. 1), for example, a wireless communication device, e.g., wireless communication device 102 (FIG. 1).

As indicated at block 702, the method may include transmitting a MU downlink request to a plurality of wireless stations. For example, transmitter 104 (FIG. 1) may transmit a MU DL data request to devices 132, 160 and/or 170 (FIG. 1), e.g., as described above.

As indicated at block 704, the method may include receiving one or more responses from one or more wireless stations of the plurality of wireless stations. For example, receiver 106 (FIG. 1) may receive one or more poll responses from one or more of devices 132, 160 and/or 170 (FIG. 1), e.g., as described above.

As indicated at block 706, the method may include transmitting to the plurality of wireless stations a MU scheduling message indicating resources allocated to a downlink transmission to at least one scheduled station of the one or more wireless stations. For example, transmitter 104 (FIG. 1) may transmit a MU scheduling message to at least one of devices 132, 160 and 170 (FIG. 1), e.g., as described above.

As indicated at block 708, the method may include transmitting the downlink transmission to the at least one scheduled station according to the MU scheduling message. For example, transmitter 104 (FIG. 1) may transmit the DL transmission to at least one of devices 132, 160 and 170 (FIG. 1), e.g., as described above.

Figure 8:
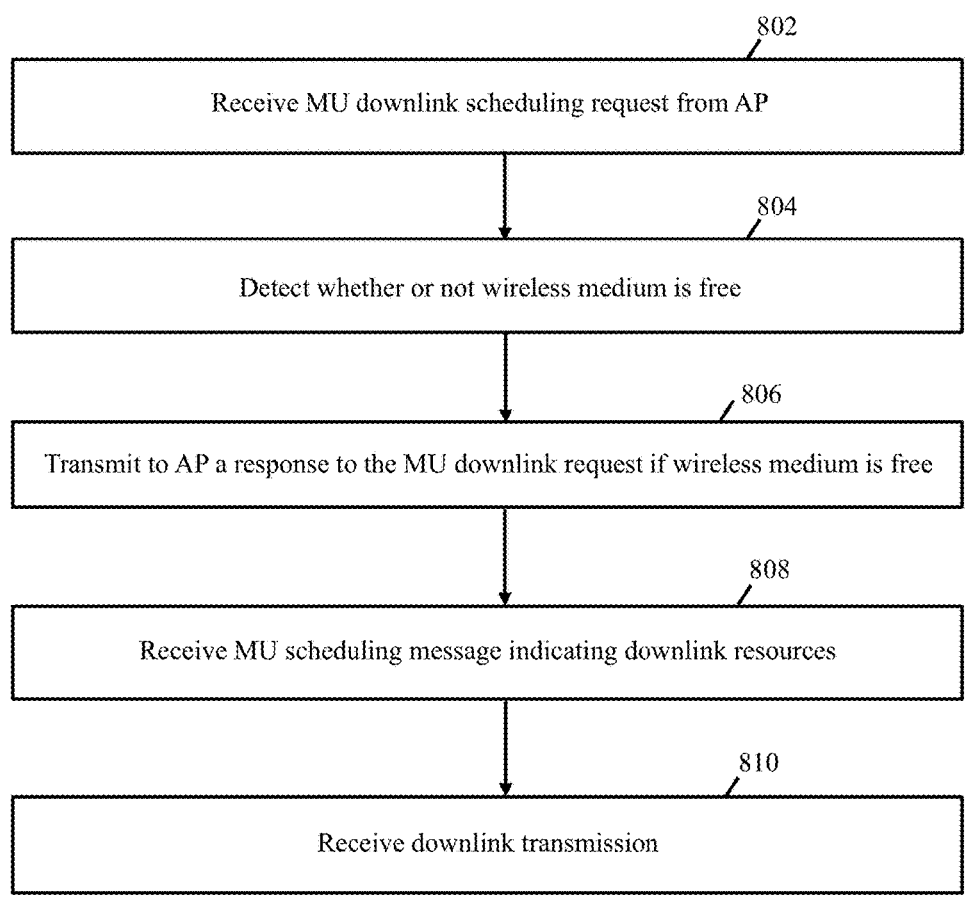
FIG. 8 is a schematic flow-chart illustration of a method of multi-user downlink transmission, in accordance with some demonstrative embodiments.

Reference is made to FIG. 8, which schematically illustrates a method of MU uplink transmission, in accordance with some demonstrative embodiments. In some demonstrative embodiments, one or more of the operations of the method of FIG. 8 may be performed by one or more elements of a system, e.g., system 100 (FIG. 1), for example, a wireless communication device, e.g., wireless communication device 132 (FIG. 1).

As indicated at block 802, the method may include receiving a MU downlink request from an AP. For example, receiver 136 (FIG. 1) may receive a MU DL request from device 102 (FIG. 1), e.g., as described above.

As indicated at block 804, the method may include detecting whether or not a wireless medium is free. For example, detector 141 (FIG. 1) may detect whether or not the wireless medium is free at a location of device 132 (FIG. 1), e.g., as described above.

As indicated at block 806, the method may include transmitting to the AP a response to the MU downlink request only if the wireless medium is detected to be free. For example, transmitter 134 (FIG. 1) may transmit to AP 102 (FIG. 1) a poll response, for example, if the wireless medium is detected to be free, e.g., as described above.

As indicated at block 808, the method may include receiving a MU scheduling message indicating resources allocated to a downlink transmission, e.g., subsequent to transmission of the response. For example, receiver 136 (FIG. 1) may receive the DL scheduling message from AP 102 (FIG. 1), e.g., as described above.

As indicated at block 810, the method may include receiving the downlink transmission, e.g., subsequent to the MU scheduling message. For example, receiver 136 (FIG. 1) may receive the DL transmission from AP 102 (FIG. 1), e.g., as described above.

Figure 9:
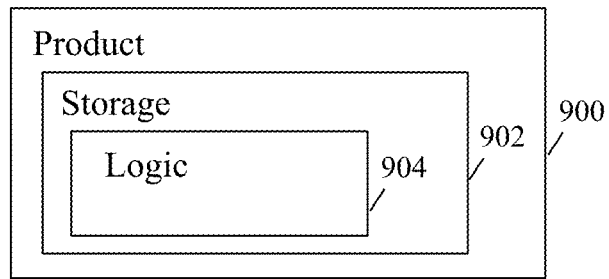
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include a non-transitory machine-readable storage medium 902 to store logic 904, which may be used, for example, to perform at least part of the functionality of device 102 (FIG. 1), device 132 (FIG. 1), device 160 (FIG. 1), device 170 (FIG. 1), scheduler 110 (FIG. 1), controller 140 (FIG. 1), and/or to perform one or more of the operations of the method of FIG. 7 or FIG. 8. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a transmitter to transmit a multi-user (MU) downlink request to a plurality of wireless stations; and a receiver to receive one or more responses from one or more wireless stations of the plurality of wireless stations, wherein the transmitter is to transmit to the plurality of wireless stations a MU scheduling message indicating resources allocated to a downlink transmission to at least one scheduled station of the one or more wireless stations, and to transmit the downlink transmission to the at least one scheduled station according to the MU scheduling message.

Example 2 includes the subject matter of Example 1, and optionally, wherein the one or more responses include two or more responses from two or more wireless stations.

Example 3 includes the subject matter of Example 2, and optionally, wherein the at least one scheduled station comprises a plurality of scheduled stations, the downlink transmission including a MU downlink transmission to the plurality of scheduled stations.

Example 4 includes the subject matter of Example 3, and optionally, wherein the MU downlink transmission comprises a plurality of simultaneous downlink data transmissions to the plurality of scheduled stations.

Example 5 includes the subject matter of Example 3 or 4, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 6 includes the subject matter of any one of Examples 1-5, and optionally, wherein, subsequent to transmission of the MU scheduling message, the receiver is to receive at least one reservation frame from the at least one scheduled wireless station, the reservation frame to reserve a wireless medium for at least a duration of the downlink transmission.

Example 7 includes the subject matter of Example 6, and optionally, wherein the reservation frame comprises a clear-to-send (CTS) frame.

Example 8 includes the subject matter of Example 6 or 7, and optionally, wherein the at least one reservation frame comprises two or more identical reservation frames.

Example 9 includes the subject matter of any one of Examples 1-8, and optionally, wherein the one or more responses include one or more uplink indications, the MU scheduling message to indicate uplink resources, the uplink resources being allocated to one or more uplink transmissions form the one or more wireless stations based on the uplink indications.

Example 10 includes the subject matter of any one of Examples 1-9, and optionally, wherein the MU scheduling message includes an acknowledgment schedule of at least one acknowledgement from the at least one scheduled station to acknowledge the downlink transmission.

Example 11 includes the subject matter of any one of Examples 1-10, and optionally, wherein the MU downlink request comprises a medium reservation duration to reserve a wireless medium for at least a time period between transmission of the MU downlink request and an end of the downlink transmission.

Example 12 includes the subject matter of any one of Examples 1-11, and optionally, wherein the MU downlink request comprises a MU poll frame, and wherein the one or more responses include one or more poll responses.

Example 13 includes the subject matter of any one of Examples 1-12, and optionally, wherein the MU scheduling message comprises a downlink resource allocation map.

Example 14 includes the subject matter of any one of Examples 1-13 being an Access Point (AP) including one or more antennas, a processor, and a memory.

Example 15 includes an apparatus of wireless communication, the apparatus comprising a receiver to receive a multi-user (MU) downlink request from an Access Point (AP); a detector to detect whether or not a wireless medium is free; and a transmitter to transmit to the AP a response to the MU downlink request only if the wireless medium is detected to be free, wherein the receiver is to receive, subsequent to transmission of the response, a MU scheduling message indicating resources allocated to a downlink transmission, and to receive the downlink transmission, subsequent to the MU scheduling message.

Example 16 includes the subject matter of Example 15, and optionally, wherein the downlink transmission includes a MU downlink transmission to a plurality of scheduled stations.

Example 17 includes the subject matter of Example 16, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 18 includes the subject matter of any one of Examples 15-17, and optionally, wherein, subsequent to receipt of the MU scheduling message, the transmitter is to transmit a reservation frame to reserve the wireless medium for at least a duration of the downlink transmission.

Example 19 includes the subject matter of Example 18, and optionally, wherein the transmitter is to transmit to the AP an acknowledgement to acknowledge the downlink transmission, the reservation frame to further reserve the wireless medium for a duration of the acknowledgement.

Example 20 includes the subject matter of Example 18 or 19, and optionally, wherein the reservation frame comprises a clear-to-send (CTS) frame.

Example 21 includes the subject matter of any one of Examples 15-20, and optionally, wherein the response includes an uplink indication to indicate a requested uplink transmission, and the MU scheduling message is to indicate uplink resources allocated to the uplink transmission.

Example 22 includes the subject matter of any one of Examples 15-21, and optionally, wherein the MU scheduling message includes an acknowledgment schedule, the transmitter to transmit to the AP an acknowledgement to acknowledge the downlink transmission according to the acknowledgement schedule.

Example 23 includes the subject matter of any one of Examples 15-22, and optionally, wherein the MU downlink request comprises a medium reservation duration to reserve the wireless medium for at least a time period between transmission of the MU downlink request and an end of the downlink transmission.

Example 24 includes the subject matter of any one of Examples 15-23, and optionally, wherein the MU downlink request comprises a MU poll frame, and wherein the response includes a poll response.

Example 25 includes the subject matter of any one of Examples 15-24, and optionally, wherein the MU scheduling message comprises a downlink resource allocation map.

Example 26 includes the subject matter of any one of Examples 15-25 being a wireless station including one or more antennas, a processor, and a memory.

Example 27 includes an access Point (AP) comprising one or more antennas; a memory; a processor; a transmitter to transmit a multi-user (MU) downlink request to a plurality of wireless stations; and a receiver to receive one or more responses from one or more wireless stations of the plurality of wireless stations, wherein the transmitter is to transmit to the plurality of wireless stations a MU scheduling message indicating resources allocated to a downlink transmission to at least one scheduled station of the one or more wireless stations, and to transmit the downlink transmission to the at least one scheduled station according to the MU scheduling message.

Example 28 includes the subject matter of Example 27, and optionally, wherein the one or more responses include two or more responses from two or more wireless stations.

Example 29 includes the subject matter of Example 28, and optionally, wherein the at least one scheduled station comprises a plurality of scheduled stations, the downlink transmission including a MU downlink transmission to the plurality of scheduled stations.

Example 30 includes the subject matter of Example 29, and optionally, wherein the MU downlink transmission comprises a plurality of simultaneous downlink data transmissions to the plurality of scheduled stations.

Example 31 includes the subject matter of Example 29 or 30, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 32 includes the subject matter of any one of Examples 27-31, and optionally, wherein, subsequent to transmission of the MU scheduling message, the receiver is to receive at least one reservation frame from the at least one scheduled wireless station, the reservation frame to reserve a wireless medium for at least a duration of the downlink transmission.

Example 33 includes the subject matter of Example 32, and optionally, wherein the reservation frame comprises a clear-to-send (CTS) frame.

Example 34 includes the subject matter of Example 32 or 33, and optionally, wherein the at least one reservation frame comprises two or more identical reservation frames.

Example 35 includes the subject matter of any one of Examples 27-34, and optionally, wherein the one or more responses include one or more uplink indications, the MU scheduling message to indicate uplink resources, the uplink resources being allocated to one or more uplink transmissions form the one or more wireless stations based on the uplink indications.

Example 36 includes the subject matter of any one of Examples 27-35, and optionally, wherein the MU scheduling message includes an acknowledgment schedule of at least one acknowledgement from the at least one scheduled station to acknowledge the downlink transmission.

Example 37 includes the subject matter of any one of Examples 27-36, and optionally, wherein the MU downlink request comprises a medium reservation duration to reserve a wireless medium for at least a time period between transmission of the MU downlink request and an end of the downlink transmission.

Example 38 includes the subject matter of any one of Examples 27-37, and optionally, wherein the MU downlink request comprises a MU poll frame, and wherein the one or more responses include one or more poll responses.

Example 39 includes the subject matter of any one of Examples 27-38, and optionally, wherein the MU scheduling message comprises a downlink resource allocation map.

Example 40 includes a wireless station comprising one or more antennas; a memory; a processor; a receiver to receive a multi-user (MU) downlink request from an Access Point (AP); a detector to detect whether or not a wireless medium is free; and a transmitter to transmit to the AP a response to the MU downlink request only if the wireless medium is detected to be free, wherein the receiver is to receive, subsequent to transmission of the response, a MU scheduling message indicating resources allocated to a downlink transmission, and to receive the downlink transmission, subsequent to the MU scheduling message.

Example 41 includes the subject matter of Example 40, and optionally, wherein the downlink transmission includes a MU downlink transmission to a plurality of scheduled stations.

Example 42 includes the subject matter of Example 41, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 43 includes the subject matter of any one of Examples 40-42, and optionally, wherein, subsequent to receipt of the MU scheduling message, the transmitter is to transmit a reservation frame to reserve the wireless medium for at least a duration of the downlink transmission.

Example 44 includes the subject matter of Example 43, and optionally, wherein the transmitter is to transmit to the AP an acknowledgement to acknowledge the downlink transmission, the reservation frame to further reserve the wireless medium for a duration of the acknowledgement.

Example 45 includes the subject matter of Example 43 or 44, and optionally, wherein the reservation frame comprises a clear-to-send (CTS) frame.

Example 46 includes the subject matter of any one of Examples 40-45, and optionally, wherein the response includes an uplink indication to indicate a requested uplink transmission, and the MU scheduling message is to indicate uplink resources allocated to the uplink transmission.

Example 47 includes the subject matter of any one of Examples 40-46, and optionally, wherein the MU scheduling message includes an acknowledgment schedule, the transmitter to transmit to the AP an acknowledgement to acknowledge the downlink transmission according to the acknowledgement schedule.

Example 48 includes the subject matter of any one of Examples 40-47, and optionally, wherein the MU downlink request comprises a medium reservation duration to reserve the wireless medium for at least a time period between transmission of the MU downlink request and an end of the downlink transmission.

Example 49 includes the subject matter of any one of Examples 40-48, and optionally, wherein the MU downlink request comprises a MU poll frame, and wherein the response includes a poll response.

Example 50 includes the subject matter of any one of Examples 40-49, and optionally, wherein the MU scheduling message comprises a downlink resource allocation map.

Example 51 includes an method performed by an Access point (AP), the method comprising transmitting a multi-user (MU) downlink request to a plurality of wireless stations; receiving one or more responses from one or more wireless stations of the plurality of wireless stations; transmitting to the plurality of wireless stations a MU scheduling message indicating resources allocated to a downlink transmission to at least one scheduled station of the one or more wireless stations; and transmitting the downlink transmission to the at least one scheduled station according to the MU scheduling message.

Example 52 includes the subject matter of Example 51, and optionally, wherein the one or more responses include two or more responses from two or more wireless stations.

Example 53 includes the subject matter of Example 52, and optionally, wherein the at least one scheduled station comprises a plurality of scheduled stations, the downlink transmission including a MU downlink transmission to the plurality of scheduled stations.

Example 54 includes the subject matter of Example 53, and optionally, wherein the MU downlink transmission comprises a plurality of simultaneous downlink data transmissions to the plurality of scheduled stations.

Example 55 includes the subject matter of Example 53 or 54, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 56 includes the subject matter of any one of Examples 51-55, and optionally, comprising, subsequent to transmission of the MU scheduling message, receiving at least one reservation frame from the at least one scheduled wireless station, the reservation frame to reserve a wireless medium for at least a duration of the downlink transmission.

Example 57 includes the subject matter of Example 56, and optionally, wherein the reservation frame comprises a clear-to-send (CTS) frame.

Example 58 includes the subject matter of Example 56 or 57, and optionally, wherein the at least one reservation frame comprises two or more identical reservation frames.

Example 59 includes the subject matter of any one of Examples 51-58, and optionally, wherein the one or more responses include one or more uplink indications, the MU scheduling message to indicate uplink resources, the uplink resources being allocated to one or more uplink transmissions form the one or more wireless stations based on the uplink indications.

Example 60 includes the subject matter of any one of Examples 51-59, and optionally, wherein the MU scheduling message includes an acknowledgment schedule of at least one acknowledgement from the at least one scheduled station to acknowledge the downlink transmission.

Example 61 includes the subject matter of any one of Examples 51-60, and optionally, wherein the MU downlink request comprises a medium reservation duration to reserve a wireless medium for at least a time period between transmission of the MU downlink request and an end of the downlink transmission.

Example 62 includes the subject matter of any one of Examples 51-61, and optionally, wherein the MU downlink request comprises a MU poll frame, and wherein the one or more responses include one or more poll responses.

Example 63 includes the subject matter of any one of Examples 51-62, and optionally, wherein the MU scheduling message comprises a downlink resource allocation map.

Example 64 includes a method performed by a wireless station, the method comprising receiving a multi-user (MU) downlink request from an Access Point (AP); detecting whether or not a wireless medium is free; transmitting to the AP a response to the MU downlink request only if the wireless medium is detected to be free; subsequent to transmission of the response, receiving a MU scheduling message indicating resources allocated to a downlink transmission; and receiving the downlink transmission, subsequent to the MU scheduling message.

Example 65 includes the subject matter of Example 64, and optionally, wherein the downlink transmission includes a MU downlink transmission to a plurality of scheduled stations.

Example 66 includes the subject matter of Example 65, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 67 includes the subject matter of any one of Examples 64-66, and optionally, comprising, subsequent to receipt of the MU scheduling message, transmitting a reservation frame to reserve the wireless medium for at least a duration of the downlink transmission.

Example 68 includes the subject matter of Example 67, and optionally, comprising transmitting to the AP an acknowledgement to acknowledge the downlink transmission, the reservation frame to further reserve the wireless medium for a duration of the acknowledgement.

Example 69 includes the subject matter of Example 67 or 68, and optionally, wherein the reservation frame comprises a clear-to-send (CTS) frame.

Example 70 includes the subject matter of any one of Examples 64-69, and optionally, wherein the response includes an uplink indication to indicate a requested uplink transmission, and the MU scheduling message is to indicate uplink resources allocated to the uplink transmission.

Example 71 includes the subject matter of any one of Examples 64-70, and optionally, wherein the MU scheduling message includes an acknowledgment schedule, the method comprising transmitting to the AP an acknowledgement to acknowledge the downlink transmission according to the acknowledgement schedule.

Example 72 includes the subject matter of any one of Examples 64-71, and optionally, wherein the MU downlink request comprises a medium reservation duration to reserve the wireless medium for at least a time period between transmission of the MU downlink request and an end of the downlink transmission.

Example 73 includes the subject matter of any one of Examples 64-72, and optionally, wherein the MU downlink request comprises a MU poll frame, and wherein the response includes a poll response.

Example 74 includes the subject matter of any one of Examples 64-73, and optionally, wherein the MU scheduling message comprises a downlink resource allocation map.

Example 75 includes a product including one or more tangible computer-readable non-transitory storage media comprising computer-executable instructions operable to, when executed by at least one computer processor, enable the at least one computer processor to implement a method at an Access Point (AP), the method comprising transmitting a multi-user (MU) downlink request to a plurality of wireless stations; receiving one or more responses from one or more wireless stations of the plurality of wireless stations; transmitting to the plurality of wireless stations a MU scheduling message indicating resources allocated to a downlink transmission to at least one scheduled station of the one or more wireless stations; and transmitting the downlink transmission to the at least one scheduled station according to the MU scheduling message.

Example 76 includes the subject matter of Example 75, and optionally, wherein the one or more responses include two or more responses from two or more wireless stations.

Example 77 includes the subject matter of Example 76, and optionally, wherein the at least one scheduled station comprises a plurality of scheduled stations, the downlink transmission including a MU downlink transmission to the plurality of scheduled stations.

Example 78 includes the subject matter of Example 77, and optionally, wherein the MU downlink transmission comprises a plurality of simultaneous downlink data transmissions to the plurality of scheduled stations.

Example 79 includes the subject matter of Example 77 or 78, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 80 includes the subject matter of any one of Examples 75-79, and optionally, wherein the method comprises, subsequent to transmission of the MU scheduling message, receiving at least one reservation frame from the at least one scheduled wireless station, the reservation frame to reserve a wireless medium for at least a duration of the downlink transmission.

Example 81 includes the subject matter of Example 80, and optionally, wherein the reservation frame comprises a clear-to-send (CTS) frame.

Example 82 includes the subject matter of Example 80 or 81, and optionally, wherein the at least one reservation frame comprises two or more identical reservation frames.

Example 83 includes the subject matter of any one of Examples 75-82, and optionally, wherein the one or more responses include one or more uplink indications, the MU scheduling message to indicate uplink resources, the uplink resources being allocated to one or more uplink transmissions form the one or more wireless stations based on the uplink indications.

Example 84 includes the subject matter of any one of Examples 75-83, and optionally, wherein the MU scheduling message includes an acknowledgment schedule of at least one acknowledgement from the at least one scheduled station to acknowledge the downlink transmission.

Example 85 includes the subject matter of any one of Examples 75-84, and optionally, wherein the MU downlink request comprises a medium reservation duration to reserve a wireless medium for at least a time period between transmission of the MU downlink request and an end of the downlink transmission.

Example 86 includes the subject matter of any one of Examples 75-85, and optionally, wherein the MU downlink request comprises a MU poll frame, and wherein the one or more responses include one or more poll responses.

Example 87 includes the subject matter of any one of Examples 75-86, and optionally, wherein the MU scheduling message comprises a downlink resource allocation map.

Example 88 includes a product including one or more tangible computer-readable non-transitory storage media comprising computer-executable instructions operable to, when executed by at least one computer processor, enable the at least one computer processor to implement a method at a wireless station, the method comprising receiving a multi-user (MU) downlink request from an Access Point (AP); detecting whether or not a wireless medium is free; transmitting to the AP a response to the MU downlink request only if the wireless medium is detected to be free; subsequent to transmission of the response, receiving a MU scheduling message indicating resources allocated to a downlink transmission; and receiving the downlink transmission, subsequent to the MU scheduling message.

Example 89 includes the subject matter of Example 88, and optionally, wherein the downlink transmission includes a MU downlink transmission to a plurality of scheduled stations.

Example 90 includes the subject matter of Example 89, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 91 includes the subject matter of any one of Examples 88-90, and optionally, wherein the method comprises, subsequent to receipt of the MU scheduling message, transmitting a reservation frame to reserve the wireless medium for at least a duration of the downlink transmission.

Example 92 includes the subject matter of Example 91, and optionally, wherein the method comprises transmitting to the AP an acknowledgement to acknowledge the downlink transmission, the reservation frame to further reserve the wireless medium for a duration of the acknowledgement.

Example 93 includes the subject matter of Example 91 or 92, and optionally, wherein the reservation frame comprises a clear-to-send (CTS) frame.

Example 94 includes the subject matter of any one of Examples 88-93, and optionally, wherein the response includes an uplink indication to indicate a requested uplink transmission, and the MU scheduling message is to indicate uplink resources allocated to the uplink transmission.

Example 95 includes the subject matter of any one of Examples 88-94, and optionally, wherein the MU scheduling message includes an acknowledgment schedule, the method comprising transmitting to the AP an acknowledgement to acknowledge the downlink transmission according to the acknowledgement schedule.

Example 96 includes the subject matter of any one of Examples 88-95, and optionally, wherein the MU downlink request comprises a medium reservation duration to reserve the wireless medium for at least a time period between transmission of the MU downlink request and an end of the downlink transmission.

Example 97 includes the subject matter of any one of Examples 88-96, and optionally, wherein the MU downlink request comprises a MU poll frame, and wherein the response includes a poll response.

Example 98 includes the subject matter of any one of Examples 88-97, and optionally, wherein the MU scheduling message comprises a downlink resource allocation map.

Example 99 includes an apparatus of wireless communication, the apparatus comprising means for transmitting a multi-user (MU) downlink request from an Access Point (AP) to a plurality of wireless stations; means for receiving at the AP one or more responses from one or more wireless stations of the plurality of wireless stations; means for transmitting from the AP to the plurality of wireless stations a MU scheduling message indicating resources allocated to a downlink transmission to at least one scheduled station of the one or more wireless stations; and means for transmitting the downlink transmission from the AP to the at least one scheduled station according to the MU scheduling message.

Example 100 includes the subject matter of Example 99, and optionally, wherein the one or more responses include two or more responses from two or more wireless stations.

Example 101 includes the subject matter of Example 100, and optionally, wherein the at least one scheduled station comprises a plurality of scheduled stations, the downlink transmission including a MU downlink transmission to the plurality of scheduled stations.

Example 102 includes the subject matter of Example 101, and optionally, wherein the MU downlink transmission comprises a plurality of simultaneous downlink data transmissions to the plurality of scheduled stations.

Example 103 includes the subject matter of Example 101 or 102, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 104 includes the subject matter of any one of Examples 99-103, and optionally, comprising means for, subsequent to transmission of the MU scheduling message, receiving at least one reservation frame from the at least one scheduled wireless station, the reservation frame to reserve a wireless medium for at least a duration of the downlink transmission.

Example 105 includes the subject matter of Example 104, and optionally, wherein the reservation frame comprises a clear-to-send (CTS) frame.

Example 106 includes the subject matter of Example 104 or 105, and optionally, wherein the at least one reservation frame comprises two or more identical reservation frames.

Example 107 includes the subject matter of any one of Examples 99-106, and optionally, wherein the one or more responses include one or more uplink indications, the MU scheduling message to indicate uplink resources, the uplink resources being allocated to one or more uplink transmissions form the one or more wireless stations based on the uplink indications.

Example 108 includes the subject matter of any one of Examples 99-107, and optionally, wherein the MU scheduling message includes an acknowledgment schedule of at least one acknowledgement from the at least one scheduled station to acknowledge the downlink transmission.

Example 109 includes the subject matter of any one of Examples 99-108, and optionally, wherein the MU downlink request comprises a medium reservation duration to reserve a wireless medium for at least a time period between transmission of the MU downlink request and an end of the downlink transmission.

Example 110 includes the subject matter of any one of Examples 99-109, and optionally, wherein the MU downlink request comprises a MU poll frame, and wherein the one or more responses include one or more poll responses.

Example 111 includes the subject matter of any one of Examples 99-110, and optionally, wherein the MU scheduling message comprises a downlink resource allocation map.

Example 112 includes an apparatus of wireless communication, the apparatus comprising means for receiving a multi-user (MU) downlink request from an Access Point (AP); means for detecting whether or not a wireless medium is free; means for transmitting to the AP a response to the MU downlink request only if the wireless medium is detected to be free; means for, subsequent to transmission of the response, receiving a MU scheduling message indicating resources allocated to a downlink transmission; and means for receiving the downlink transmission, subsequent to the MU scheduling message.

Example 113 includes the subject matter of Example 112, and optionally, wherein the downlink transmission includes a MU downlink transmission to a plurality of scheduled stations.

Example 114 includes the subject matter of Example 113, and optionally, wherein the MU downlink transmission comprises a MU Multi-Input-Multi-Output (MU-MIMO) downlink transmission, or an Orthogonal Frequency-Division Multiple Access (OFDMA) downlink transmission.

Example 115 includes the subject matter of any one of Examples 112-114, and optionally, comprising means for, subsequent to receipt of the MU scheduling message, transmitting a reservation frame to reserve the wireless medium for at least a duration of the downlink transmission.

Example 116 includes the subject matter of Example 115, and optionally, comprising means for transmitting to the AP an acknowledgement to acknowledge the downlink transmission, the reservation frame to further reserve the wireless medium for a duration of the acknowledgement.

Example 117 includes the subject matter of Example 115 or 116, and optionally, wherein the reservation frame comprises a clear-to-send (CTS) frame.

Example 118 includes the subject matter of any one of Examples 112-117, and optionally, wherein the response includes an uplink indication to indicate a requested uplink transmission, and the MU scheduling message is to indicate uplink resources allocated to the uplink transmission.

Example 119 includes the subject matter of any one of Examples 112-118, and optionally, wherein the MU scheduling message includes an acknowledgment schedule, the apparatus comprising means for transmitting to the AP an acknowledgement to acknowledge the downlink transmission according to the acknowledgement schedule.

Example 120 includes the subject matter of any one of Examples 112-119, and optionally, wherein the MU downlink request comprises a medium reservation duration to reserve the wireless medium for at least a time period between transmission of the MU downlink request and an end of the downlink transmission.

Example 121 includes the subject matter of any one of Examples 112-120, and optionally, wherein the MU downlink request comprises a MU poll frame, and wherein the response includes a poll response.

Example 122 includes the subject matter of any one of Examples 112-121, and optionally, wherein the MU scheduling message comprises a downlink resource allocation map.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus of wireless communication, the apparatus comprising:
    a transmitter to transmit a multi-user (MU) downlink request to a plurality of wireless stations; and
    a receiver to receive one or more responses from one or more wireless stations of the plurality of wireless stations,
    wherein the transmitter is to transmit a MU scheduling message to at least one scheduled station of the one or more wireless stations from which the one or more responses are received, the MU scheduling message indicating resources allocated to a downlink transmission to the at least one scheduled station of the one or more wireless stations, the receiver is to receive at least one reservation frame from the at least one scheduled station subsequent to said MU scheduling message, the reservation frame to reserve a wireless medium for at least a duration of the downlink transmission, the transmitter to, subsequent to the reservation frame, transmit the downlink transmission to the at least one scheduled station according to the resources indicated by the MU scheduling message.

2. The apparatus of claim 1, wherein said one or more responses include two or more responses from two or more wireless stations.

3. The apparatus of claim 2, wherein the at least one scheduled station comprises a plurality of scheduled stations, the downlink transmission including a MU downlink transmission to said plurality of scheduled stations.

4. The apparatus of claim 3, wherein said MU downlink transmission comprises a MU Multi-Input-Multi-Output (MU-MIMO) downlink transmission, or an Orthogonal Frequency-Division Multiple Access (OFDMA) downlink transmission.

5. The apparatus of claim 1, wherein the reservation frame comprises a clear-to-send (CTS) frame.

6. The apparatus of claim 1, wherein the one or more responses include one or more uplink indications, the MU scheduling message to indicate uplink resources, the uplink resources allocated to one or more uplink transmissions form the one or more wireless stations based on the uplink indications.

7. The apparatus of claim 1, wherein the MU scheduling message includes an acknowledgment schedule of at least one acknowledgement from the at least one scheduled station to acknowledge the downlink transmission.

8. The apparatus of claim 1, wherein the MU downlink request comprises a medium reservation duration to reserve the wireless medium for at least a time period between transmission of the MU downlink request and an end of said downlink transmission.

9. The apparatus of claim 1, wherein the MU downlink request comprises a MU poll frame, and wherein the one or more responses include one or more poll responses.

10. The apparatus of claim 1, wherein the MU scheduling message comprises a downlink resource allocation map.

11. The apparatus of claim 1 comprising an Access Point (AP) including one or more antennas, a processor, and a memory.

12. An apparatus of wireless communication, the apparatus comprising:
    a receiver to receive a multi-user (MU) downlink request from an Access Point (AP);

a detector to detect whether or not a wireless medium is free; and a transmitter to transmit to said AP a response to said MU downlink request only if the wireless medium is detected to be free, wherein the receiver is to receive, subsequent to transmission of the response, a MU scheduling message indicating resources allocated to a downlink transmission, the transmitter is to, subsequent to said MU scheduling message, transmit a reservation frame to reserve the wireless medium for at least a duration of the downlink transmission, and said receiver is to receive the downlink transmission, subsequent to the reservation frame.

13. The apparatus of claim 12, wherein the downlink transmission includes a MU downlink transmission to a plurality of scheduled stations.

14. The apparatus of claim 13, wherein said MU downlink transmission comprises a MU Multi-Input-Multi-Output (MU-MIMO) downlink transmission, or an Orthogonal Frequency-Division Multiple Access (OFDMA) downlink transmission.

15. The apparatus of claim 12, wherein the response includes an uplink indication to indicate a requested uplink transmission, and the MU scheduling message is to indicate uplink resources allocated to the uplink transmission.

16. The apparatus of claim 12 comprising a wireless station including one or more antennas, a processor, and a memory.

17. A product comprising one or more tangible computer-readable non-transitory storage media comprising computer-executable instructions operable to, when executed by at least one computer processor, enable the at least one computer processor to cause an Access Point (AP) to:

transmit a multi-user (MU) downlink request to a plurality of wireless stations;

receive one or more responses from one or more wireless stations of the plurality of wireless stations;

transmit a MU scheduling message to at least one scheduled station of the one or more wireless stations from which the one or more responses are received, the MU scheduling message indicating resources allocated to a downlink transmission to the at least one scheduled station of the one or more wireless stations;

receive at least one reservation frame from the at least one scheduled station subsequent to said MU scheduling message, the reservation frame to reserve a wireless medium for at least a duration of the downlink transmission; and subsequent to the reservation frame, transmit the downlink transmission to the at least one scheduled station according to the resources indicated by the MU scheduling message.

18. The product of claim 17, wherein said one or more responses include two or more responses from two or more wireless stations.

19. The product of claim 18, wherein the at least one scheduled station comprises a plurality of scheduled stations, the downlink transmission including a MU downlink transmission to said plurality of scheduled stations.

20. The product of claim 17, wherein the one or more responses include one or more uplink indications, the MU scheduling message to indicate uplink resources, the uplink resources allocated to one or more uplink transmissions form the one or more wireless stations based on the uplink indications.

21. A product comprising one or more tangible computer-readable non-transitory storage media comprising computer-executable instructions operable to, when executed by at least one computer processor, enable the at least one computer processor to cause a wireless station to:

receive a multi-user (MU) downlink request from an Access Point (AP);

detect whether or not a wireless medium is free;

transmit to said AP a response to said MU downlink request only if the wireless medium is detected to be free;

subsequent to transmission of the response, receive a MU scheduling message indicating resources allocated to a downlink transmission;

subsequent to said MU scheduling message, transmit a reservation frame to reserve the wireless medium for at least a duration of the downlink transmission; and receive the downlink transmission, subsequent to the reservation frame.

22. The product of claim 21, wherein the downlink transmission includes a MU downlink transmission to a plurality of scheduled stations.

23. The product of claim 21, wherein the response includes an uplink indication to indicate a requested uplink transmission, and the MU scheduling message is to indicate uplink resources allocated to the uplink transmission.

* * * * *